United States Patent
Kringstad

(10) Patent No.: US 11,634,283 B2
(45) Date of Patent: *Apr. 25, 2023

(54) PADDLE CONVEYOR SYSTEM

(71) Applicant: Kringstad Ironworks, Inc., Park River, ND (US)

(72) Inventor: Burnell R. Kringstad, Park River, ND (US)

(73) Assignee: Kringstad Ironworks, Inc., Park River, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,792

(22) Filed: Jan. 26, 2022

(65) Prior Publication Data
US 2022/0144555 A1    May 12, 2022

Related U.S. Application Data

(63) Continuation of application No. 16/443,204, filed on Jun. 17, 2019, now Pat. No. 11,242,203.

(51) Int. Cl.
*B65G 19/28* (2006.01)
*B65G 47/82* (2006.01)
*B65G 19/04* (2006.01)
*B65G 17/06* (2006.01)

(52) U.S. Cl.
CPC .............. *B65G 19/28* (2013.01); *B65G 19/04* (2013.01); *B65G 47/82* (2013.01)

(58) Field of Classification Search
None
See application file for complete search history.

(56) References Cited

U.S. PATENT DOCUMENTS

| | | | |
|---|---|---|---|
| 1,062,775 A * | 5/1913 | Lemon-Grader | B07C 5/36 209/545 |
| 3,480,131 A | 11/1969 | Holloway | |
| 6,702,104 B2 * | 3/2004 | Bollegraaf | B65G 17/067 198/836.1 |
| 9,272,380 B2 * | 3/2016 | Nishiki | B65G 37/00 |
| 9,301,450 B2 * | 4/2016 | Boyd | B65G 23/44 |

\* cited by examiner

*Primary Examiner* — Kavel Singh
(74) *Attorney, Agent, or Firm* — Neustel Law Offices

(57) ABSTRACT

A paddle conveyor system for efficiently removing tare, dirt, small particles, and other debris from large bulky products such as sugar beets. The paddle conveyor generally includes a first pulley including a first side and a second side and a second pulley including a first side and a second side. A first linkage is connected between the first side of the first pulley and the first side of the second pulley and a second linkage is connected between the second side of the first pulley and the second side of the second pulley. A plurality of paddles is each connected between the first linkage and the second linkage such that the plurality of paddles forms a loop for conveying a material towards the second pulley. Each of the paddles includes one or more slots through which debris from the material may fall.

20 Claims, 19 Drawing Sheets

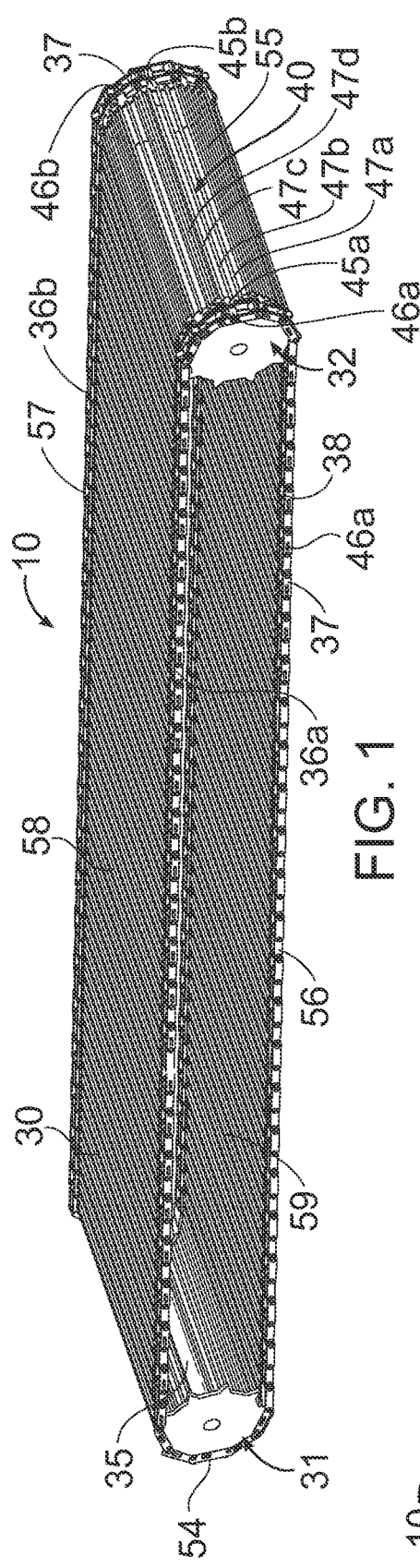
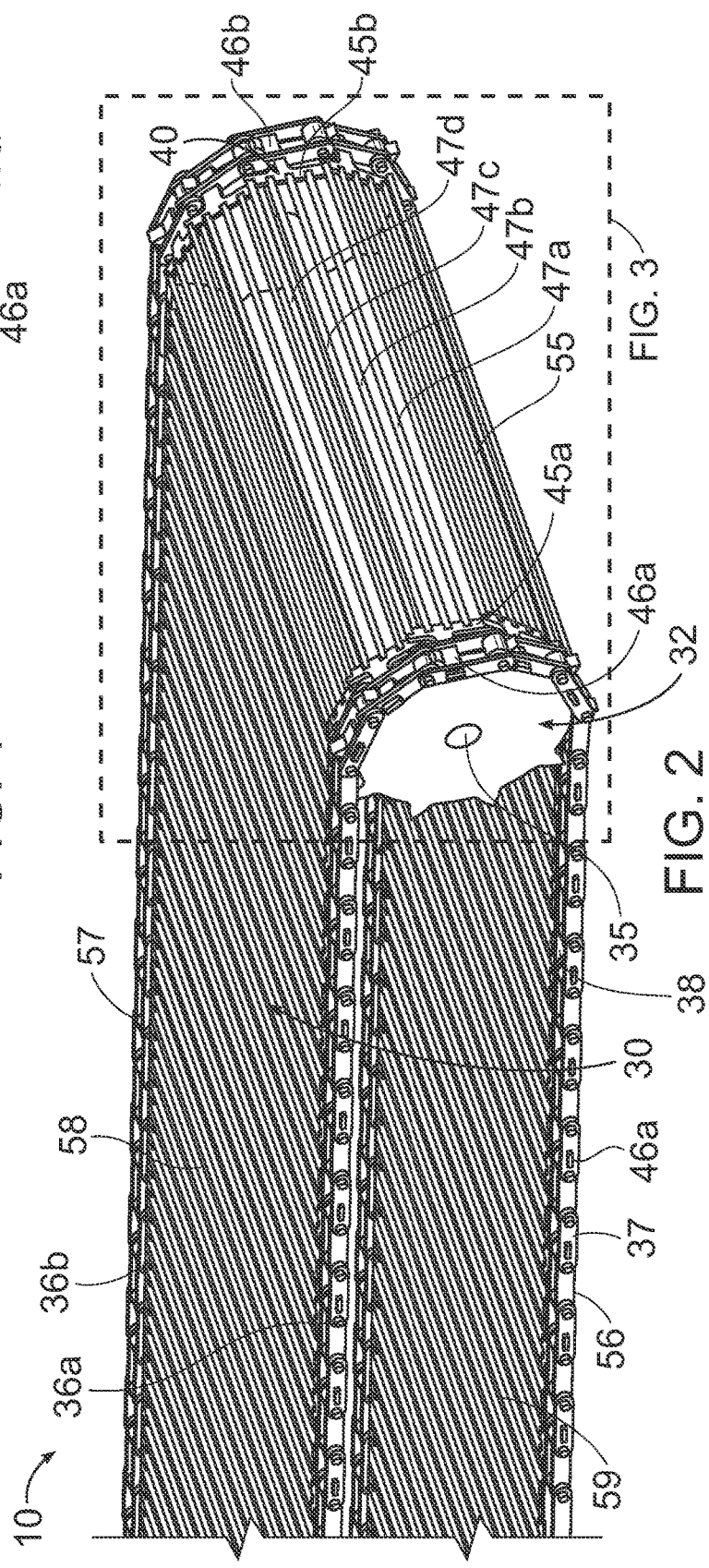

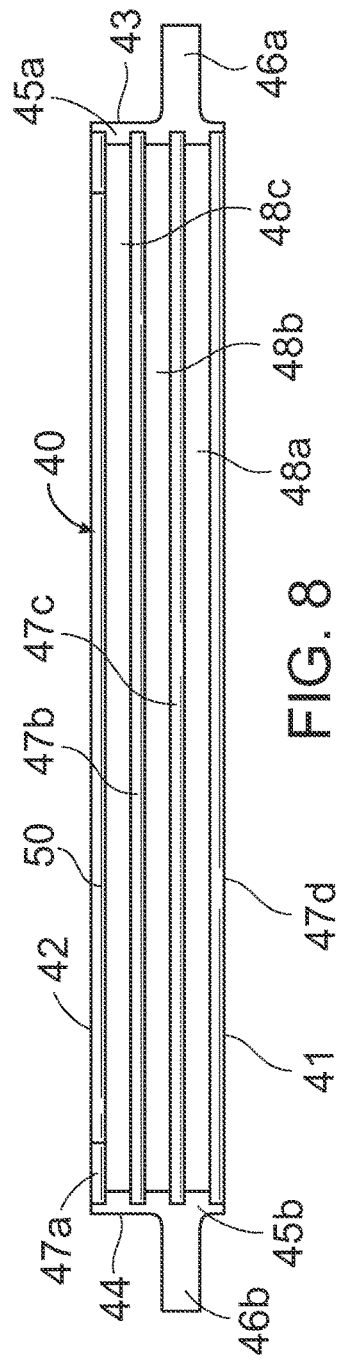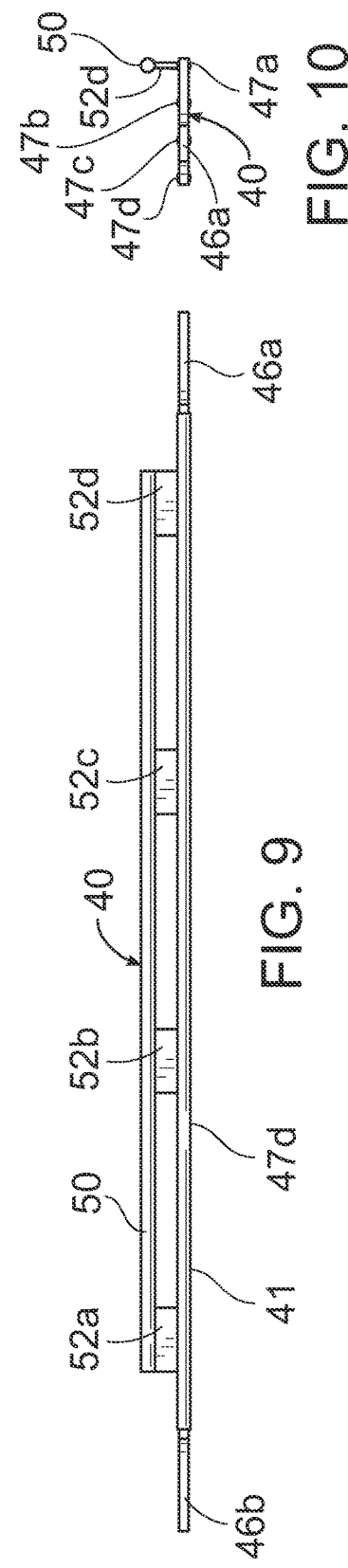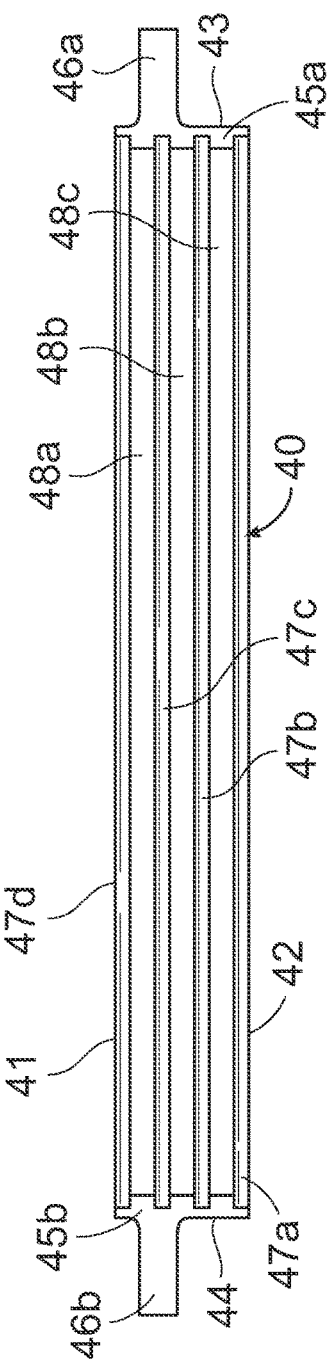

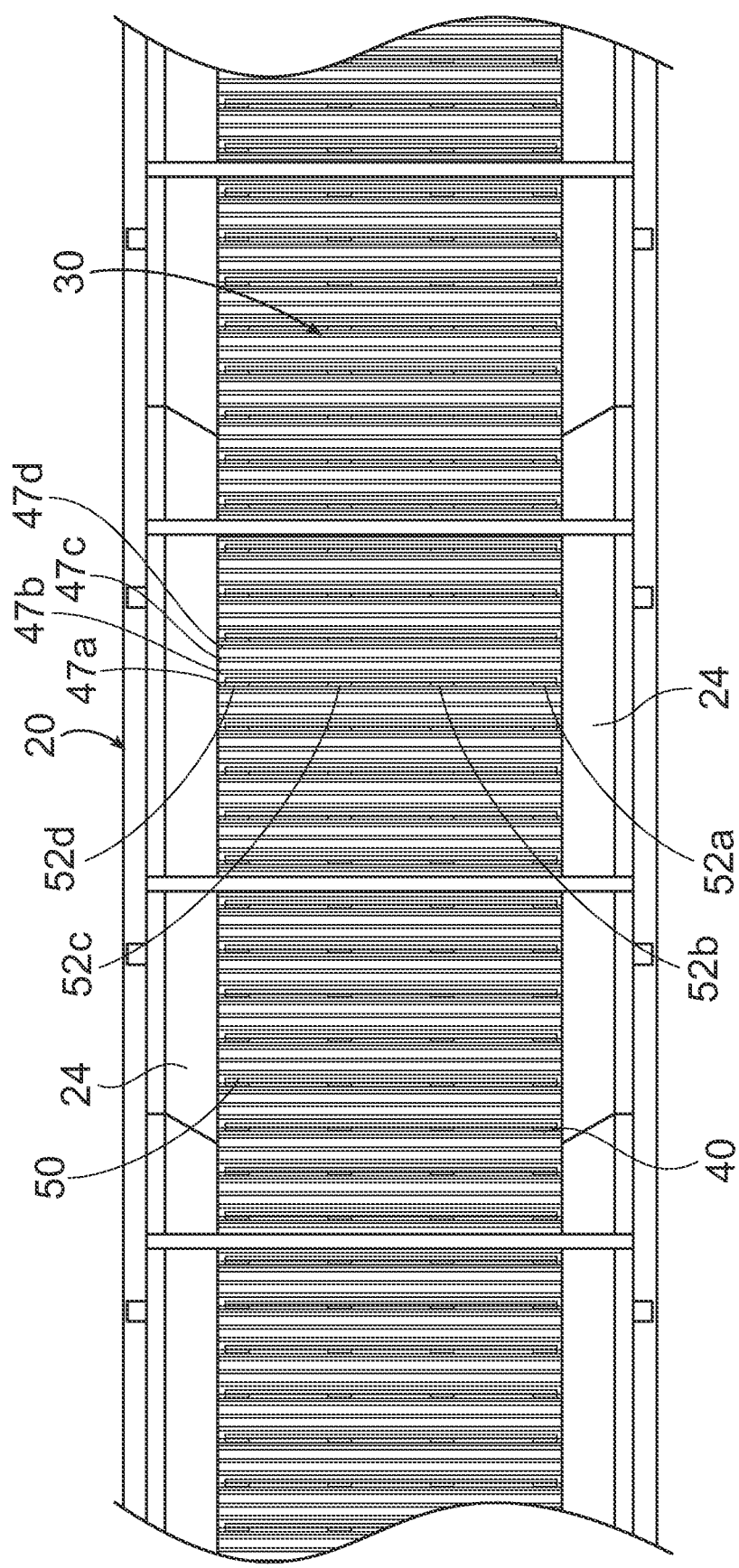

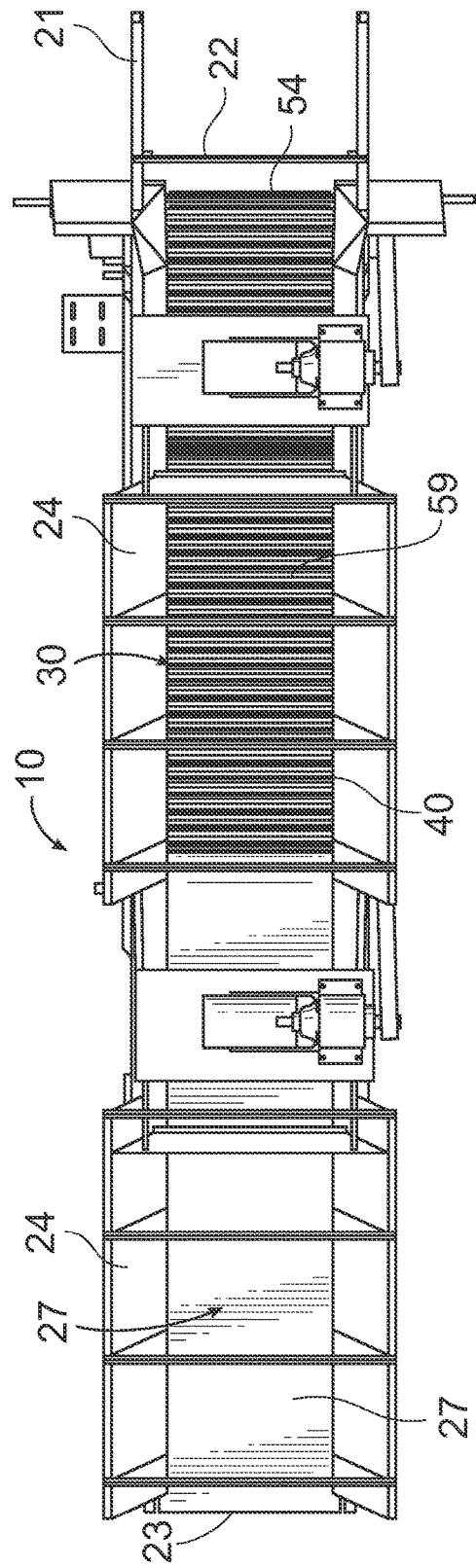
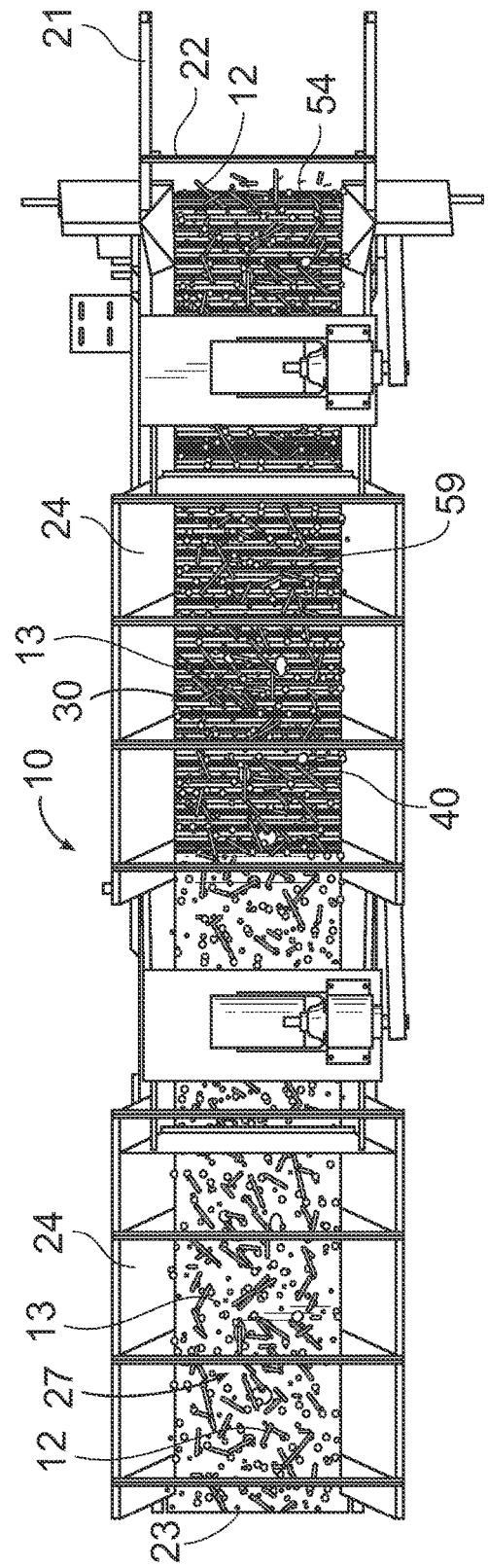
FIG. 17A
FIG. 17B

PADDLE CONVEYOR SYSTEM

CROSS REFERENCE TO RELATED APPLICATIONS

The present application is a continuation of U.S. application Ser. No. 16/443,204 filed on Jun. 17, 2019 which issues as U.S. Pat. No. 11,242,203 on Feb. 8, 2022. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a paddle conveyor system for efficiently removing tare, dirt, small particles, and other debris from large bulky products such as sugar beets.

Related Art

Any discussion of the related art throughout the specification should in no way be considered as an admission that such related art is widely known or forms part of common general knowledge in the field.

Conveyors have been used for many years for conveying various materials and products from one location to another. A particularly prevalent usage for conveyors is during the harvesting and transport of various crops, such as sugar beets, potatoes, and the like. Such crops are often harvested with a large amount of debris covering the crop, such as tare, dirt, and small particles.

In the past, conventional conveyors which utilize rollers extending perpendicular to the direction of movement have been used for conveying various materials such as crops. The rollers are arranged in a downward slope so that the materials roll down the conveyor to be discharged. Such rollers typically require a lot of moving parts, as well as motors and drives to power the rollers.

However, such rollers do not aid in removing debris from the materials. Instead, the debris will typically bounce across the rollers to be discharged along with the conveyed materials. Such a configuration requires that the debris be separated from the materials outside of the conveyor, such as via usage of a separator or by hand.

SUMMARY

An example embodiment is directed to a paddle conveyor system. The paddle conveyor includes a first (head) pulley including a first side and a second side; a second (tail) pulley including a first side and a second side; a first linkage connected between the first side of the first pulley and the first side of the second pulley; a second linkage connected between the second side of the first pulley and the second side of the second pulley; and a plurality of paddles for conveying a material towards the second pulley, wherein the plurality of paddles are each connected between the first linkage and the second linkage such that the plurality of paddles form a loop, wherein the plurality of paddles are adapted to traverse the loop, wherein each of the paddles comprises one or more slots through which debris from the material may fall.

There has thus been outlined, rather broadly, some of the embodiments of the paddle conveyor system in order that the detailed description thereof may be better understood, and in order that the present contribution to the art may be better appreciated. There are additional embodiments of the paddle conveyor system that will be described hereinafter and that will form the subject matter of the claims appended hereto. In this respect, before explaining at least one embodiment of the paddle conveyor system in detail, it is to be understood that the paddle conveyor system is not limited in its application to the details of construction or to the arrangements of the components set forth in the following description or illustrated in the drawings. The paddle conveyor system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 1 is a perspective view of a paddle conveyor of a paddle conveyor system in accordance with an example embodiment.

FIG. 2 is a close-up perspective view of a paddle conveyor of a paddle conveyor system in accordance with an example embodiment.

FIG. 8 is a top view of a paddle conveyor of a paddle conveyor system in accordance with an example embodiment.

FIG. 9 is a frontal view of a paddle conveyor system in accordance with an example embodiment.

FIG. 10 is a side view of a paddle conveyor system in accordance with an example embodiment.

FIG. 11 is a bottom view of a paddle conveyor system in accordance with an example embodiment.

FIG. 14A is a top view of a paddle conveyor system in accordance with an example embodiment.

FIG. 17A is a top view of a paddle conveyor system in accordance with an example embodiment.

FIG. 17B is a top view of a paddle conveyor system in use in accordance with an example embodiment.

DETAILED DESCRIPTION

A. Overview

Figure 3:
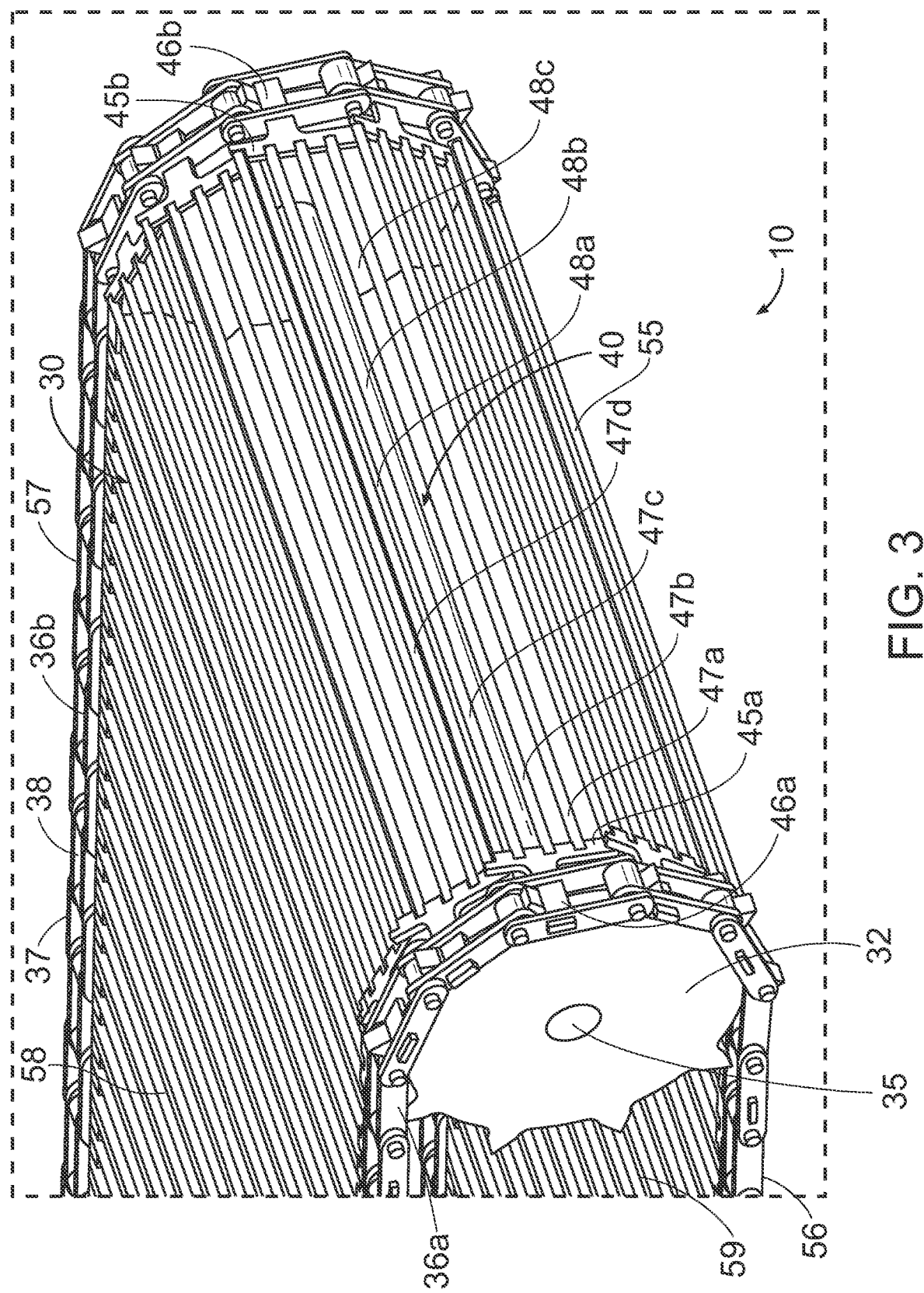
FIG. 3 is an end perspective view of a paddle conveyor of a paddle conveyor system in accordance with an example embodiment.
Figure 4:
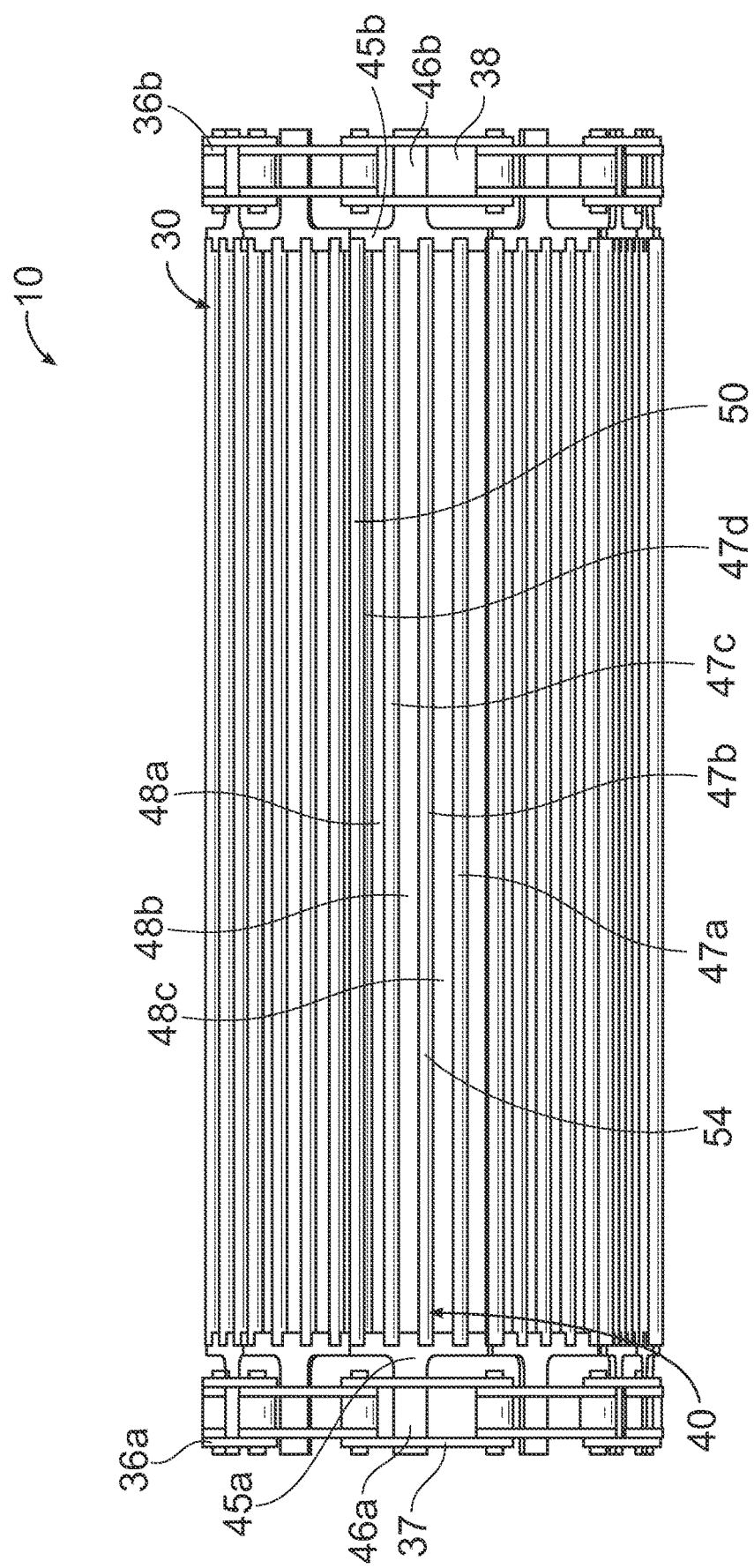
FIG. 4 is an end view of a paddle conveyor of a paddle conveyor system in accordance with an example embodiment.

An example paddle conveyor system 10 generally comprises a first (head) pulley 31 including a first side and a second side; a second (tail) pulley 32 including a first side and a second side; a first linkage 36a connected between the first side of the first pulley 31 and the first side of the second pulley 32; a second linkage 36b connected between the second side of the first pulley 31 and the second side of the second pulley 32; and a plurality of paddles 40 for conveying a material 12 towards the second pulley 32, wherein the plurality of paddles 40 are each connected between the first linkage 36a and the second linkage 36b such that the plurality of paddles 40 form a loop, wherein the plurality of paddles 40 are adapted to traverse the loop, wherein each of the paddles 40 comprises one or more slots 48a, 48b, 48c through which debris 13 from the material 12 may fall.

The paddles 40 may each comprise a plurality of cross members 47a, 47b, 47c, 47d, with each of the one or more slots 48a, 48b, 48c defined between a pair of the plurality of cross members 47a, 47b, 47c, 47d. Each of the paddles 40 may comprise a first side member 45a and a second side member 45b, with each of the cross members 47a, 47b, 47c, 47d extending between the first side member 45a and the second side member 45b.

The first side member 45a of each of the plurality of paddles 40 may comprise a first connector 46a and the second side member 45b of each of the plurality of paddles 40 may comprise a second connector 46b. The first connector 46a of each of the plurality of paddles 40 is connected to the first linkage 36a and the second connector 46b of each of the plurality of paddles 40 is connected to the second linkage 36b. Each of the plurality of paddles 40 comprises a front end 41 and a rear end 42, wherein each of the plurality of paddles 40 is angled upwardly from the rear end 42 to the front end 41 such that each of the plurality of paddles 40 overlap.

The first and second linkages 36a, 36b may be comprised of a chain. Each of the paddles 40 may comprise a stopper rod 50 for preventing the material 12 from falling back toward the rear end of the paddles 40. Each of the plurality of paddles 40 may be perpendicular with respect to a direction of movement of the paddles 40 along the loop. The stopper rod 50 may extend parallel with respect to one of the plurality of paddles 40. A plurality of mounts 52a, 52b, 52c, 52d may be connected between the stopper rod 50 and one of the plurality of paddles 40. Each of the plurality of paddles 40 may be perpendicular with respect to a direction of movement of the paddles 40 along the loop.

Another example paddle conveyor system 10 comprises a first (head) pulley 31 including a first side and a second side; a second (tail) pulley 32 including a first side and a second side; a first linkage 36a connected between the first side of the first pulley 31 and the first side of the second pulley 32; a second linkage 36b connected between the second side of the first pulley 31 and the second side of the second pulley 32; and a plurality of paddles 40 for conveying a material 12 towards the second pulley 32, wherein the plurality of paddles 40 are each connected between the first linkage 36a and the second linkage 36b such that the plurality of paddles 40 form a loop, wherein the plurality of paddles 40 are adapted to traverse the loop, wherein each of the paddles 40 comprises a plurality of cross members 47a, 47b, 47c, 47d extending between a first side member 45a and a second side member 45b, wherein each of the paddles 40 comprises one or more slots 48a, 48b, 48c defined between the cross members 47a, 47b, 47c, 47d through which debris 13 from the material 12 may fall.

Yet another example paddle conveyor system 10 comprises a first (head) pulley 31 including a first side and a second side; a second (tail) pulley 32 including a first side and a second side; a first linkage 36a connected between the first side of the first pulley 31 and the first side of the second pulley 32; a second linkage 36b connected between the second side of the first pulley 31 and the second side of the second pulley 32; and a plurality of paddles 40 for conveying a material 12 towards the second pulley 32, wherein the plurality of paddles 40 are each connected between the first linkage 36a and the second linkage 36b such that the plurality of paddles 40 form a loop, wherein the plurality of paddles 40 are adapted to traverse the loop, wherein each of the paddles 40 comprises a plurality of cross members 47a, 47b, 47c, 47d extending between a first side member 45a and a second side member 45b, wherein each of the paddles 40 comprises one or more slots 48a, 48b, 48c defined between the cross members 47a, 47b, 47c, 47d through which debris 13 from the material 12 may fall, wherein each of the paddles 40 comprises a stopper rod 50 extending parallel with respect to the cross members 47a, 47b, 47c, 47d, wherein each of the paddles 40 comprises a plurality of mounts 52a, 52b, 52c connecting the stopper rod 50 with one of the plurality of cross members 47a, 47b, 47c, 47d, wherein each of the plurality of mounts 52a, 52b, 52c extends upwardly from the one of the plurality of cross members 47a, 47b, 47c, 47d.

B. Paddle Conveyor

As shown throughout the figures, a paddle conveyor 30 may be utilized for simultaneously conveying materials 12 and cleaning debris 13 from the materials 12. An exemplary embodiment of the paddle conveyor 30 comprises a plurality of paddles 40 which are connected perpendicularly with respect to the direction of movement of the paddle conveyor 30 between a pair of linkages 36. The linkages 36 are moved via a pair of pulleys 31, 32 such that the paddle conveyor 30 forms an endless loop.

As shown in FIG. 1, the paddle conveyor 30 may comprise an endless loop configuration having a first end 54, a second end 55, a first side 56, and a second side 57. The first end 54 may comprise the head portion of the paddle conveyor 30 and the second end 55 may comprise the tail portion of the paddle conveyor 30, or vice versa. The width of the paddle conveyor 30, and thus the distance between the first side 56 and second side 57 of the paddle conveyor 30, may vary in different embodiments.

The paddle conveyor 30 may comprise an upper run 58 on which the materials 12 are conveyed and a lower run 59 along which the paddle conveyor 30 is returned in a loop. On the upper run 58, the paddles 40 are moved toward the second end 42 of the paddle conveyor 40. On the lower run 59, the paddles 40 are moved toward the first end 41 of the paddle conveyor 40.

As shown in FIG. 1, an exemplary embodiment of a paddle conveyor 30 may comprise a first pulley 31 positioned at a first end 54 of the paddle conveyor 30 and a second pulley 32 positioned at a second end 55 of the paddle conveyor 30. The first pulley 31 may comprise the head pulley of the paddle conveyor 30 and the second pulley 32 may comprise the tail pulley of the paddle conveyor 30. In other embodiments, the reverse configuration could be utilized.

The pulleys 31, 32 are adapted to be rotated, such as by a motor or the like. The manner in which the pulleys 31, 32 are rotated may vary in different embodiments. In some embodiments, one of the pulleys 31, 32 may be driven while the other of the pulleys 31, 32 may be idle. For example, the first pulley 31 may comprise a driven pulley and the second pulley 32 may comprise an idle pulley, or vice versa. In other embodiments, both pulleys 31, 32 may be driven.

In the exemplary embodiment shown in the figures, the each of the pulleys 31, 32 may comprise one or more pulley gears 33. By way of example, the pulleys 31, 32 could each comprise one, two, three, or more pulley gears 33 which are concentrically aligned with each other. The type, size, configuration, and number of pulleys 31, 32 may vary in different embodiments and thus should not be construed as limited by the exemplary embodiments shown in the figures.

In the exemplary embodiment shown in FIG. 1, each of the pulleys 31, 32 comprises a pair of concentric, spaced-apart pulley gears 33 which are interconnected by an axle 35. In some embodiments, each of the pulleys 31, 32 may comprise an elongated, cylindrical member rather than discrete gears 33 separated by an axle 35. In either case, the pulleys 31, 32 are rotated so as to rotate the paddles 40 along a looped path as discussed herein.

The first pulley 31 is positioned at a first end 54 of the paddle conveyor 30 and the second pulley 32 is positioned at a second end 55 of the paddle conveyor 30. The first pulley 31 and the second pulley 32 each extend between the first side 56 and the second side 57 of the paddle conveyor 30. In the exemplary embodiment shown in the figures, each of the pulleys 31, 32 comprises a first pulley gear 33 at a first side 56 and a second pulley gear 33 at a second side 57 of the paddle conveyor 30.

Each of the pulleys 31, 32 may comprise one or more projections 34 so as to engage with a linkage 36a, 36b. In the exemplary embodiment shown in FIGS. 1-5, it can be seen that the projections 34 are positioned radially outwardly from each of the pulley gears 33. The projections 34 engage within a receiver opening 38 of the linkages 36a, 36b so that the linkages 36a, 36b may be advanced along the loop path.

Figure 5:
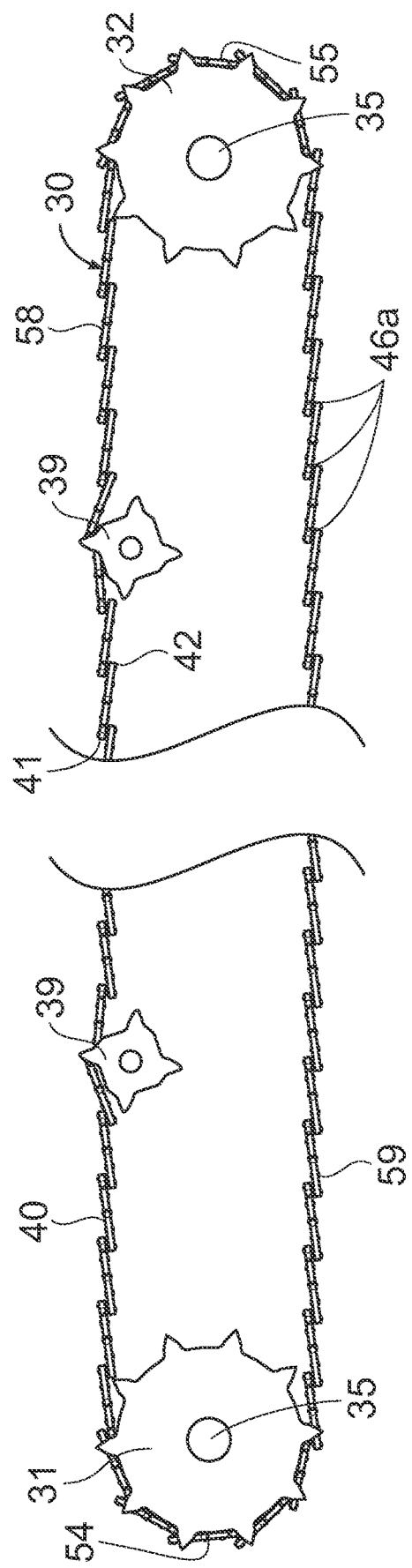
FIG. 5 is a side sectional view of a paddle conveyor of a paddle conveyor system in accordance with an example embodiment.

As shown in FIGS. 1 and 5, a pair of linkages 36a, 36b are connected between the pulleys 31, 32. In the exemplary embodiment shown in the figures, a first linkage 36a is connected between the first pulley 31 and the second pulley 32 at the first side 56 of the paddle conveyor 30. Similarly, a second linkage 36b is connected between the first pulley 31 and the second pulley 32 at the second side 57 of the paddle conveyor 30. Thus, the first pulley 31 is linked to the second pulley 32 by the linkages 36a, 36b as best shown in FIG. 1.

Figure 7:
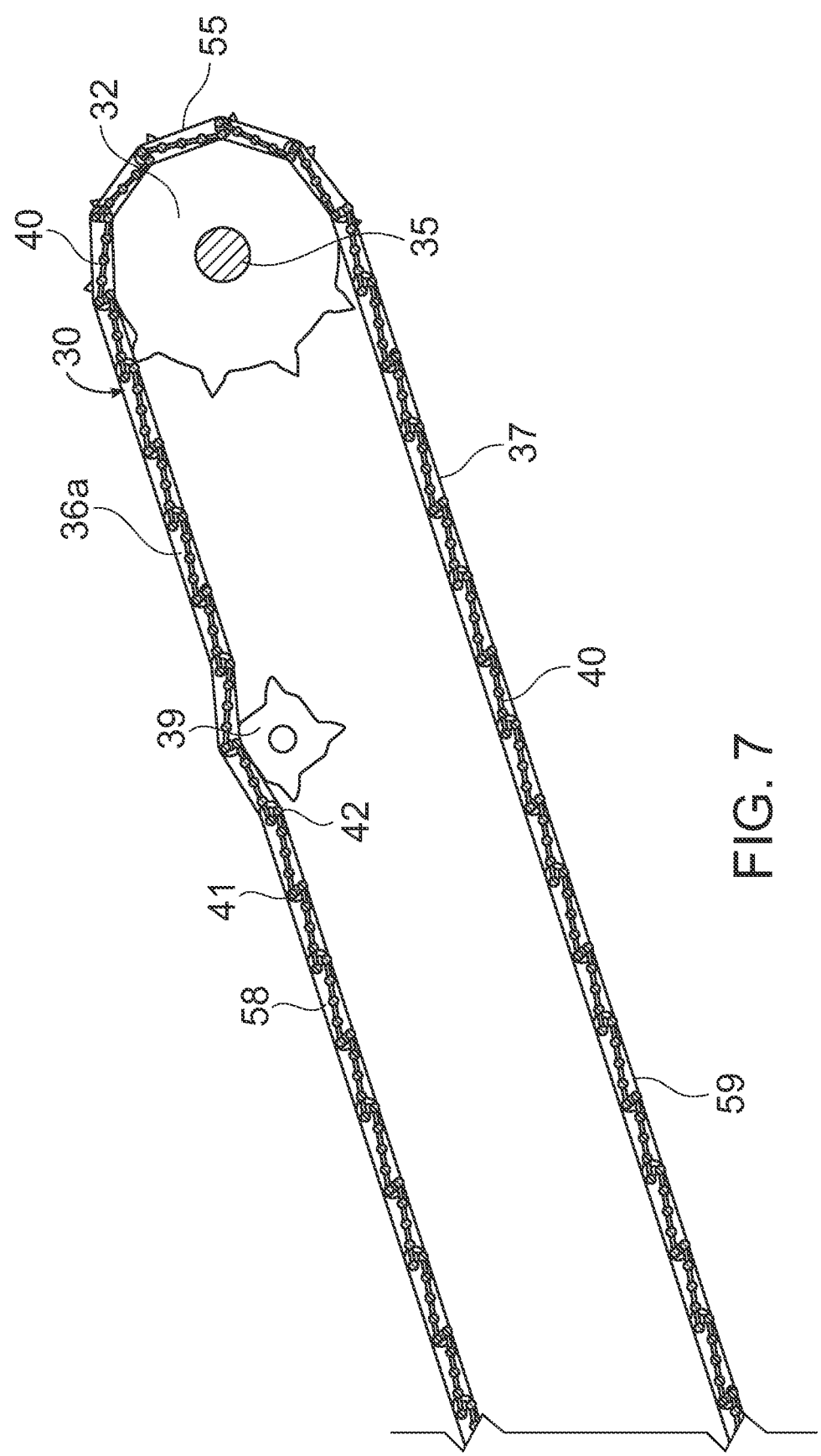
FIG. 7 is a partial side sectional view of a paddle conveyor of a paddle conveyor system in accordance with an example embodiment.

Various types of linkages 36a, 36b may be utilized in different embodiments. The linkages 36a, 36b will generally comprise elongated members that are looped around the pulleys 31, 32 such as shown in FIGS. 1, 5, and 7. In the exemplary embodiment shown in the figures, the linkages 36a, 36b comprise chains having a plurality of chain links 37 including receiver openings 38 in which the projections 34 of the pulleys 31, 32 engage. It should be appreciated that other types of linkages 36a, 36b may be utilized, such as ropes, bands, straps, and the like.

As best shown in FIGS. 5 and 7, one or more idler gears 39 may be positioned between the first pulley 31 and the second pulley 32. The idler gears 39 are not driven, but are freely rotatable so that the paddle conveyor 30 may traverse over the idler gears 39. The idler gears 39 may be utilized to maintain an even surface for the upper run 58 of the paddle conveyor 30 and prevent drooping. In some embodiments, idler gears 39 may be omitted. The number, type, size, and spacing of idler gears 39 may vary in different embodiments and thus should not be construed as limited by the exemplary figures.

C. Paddles

As shown throughout the figures, the paddle conveyor 30 comprises a plurality of interconnected paddles 40, with each paddle 40 being connected between the first linkage 36a and the second linkage 36b. The paddles 40 are illustrated as being oriented perpendicular to the direction of movement of the paddle conveyor 30. It should be appreciated that the paddles 40 could be oriented at different angles with respect to the direction of movement of the paddle conveyor 30 in different embodiments.

Figure 12:
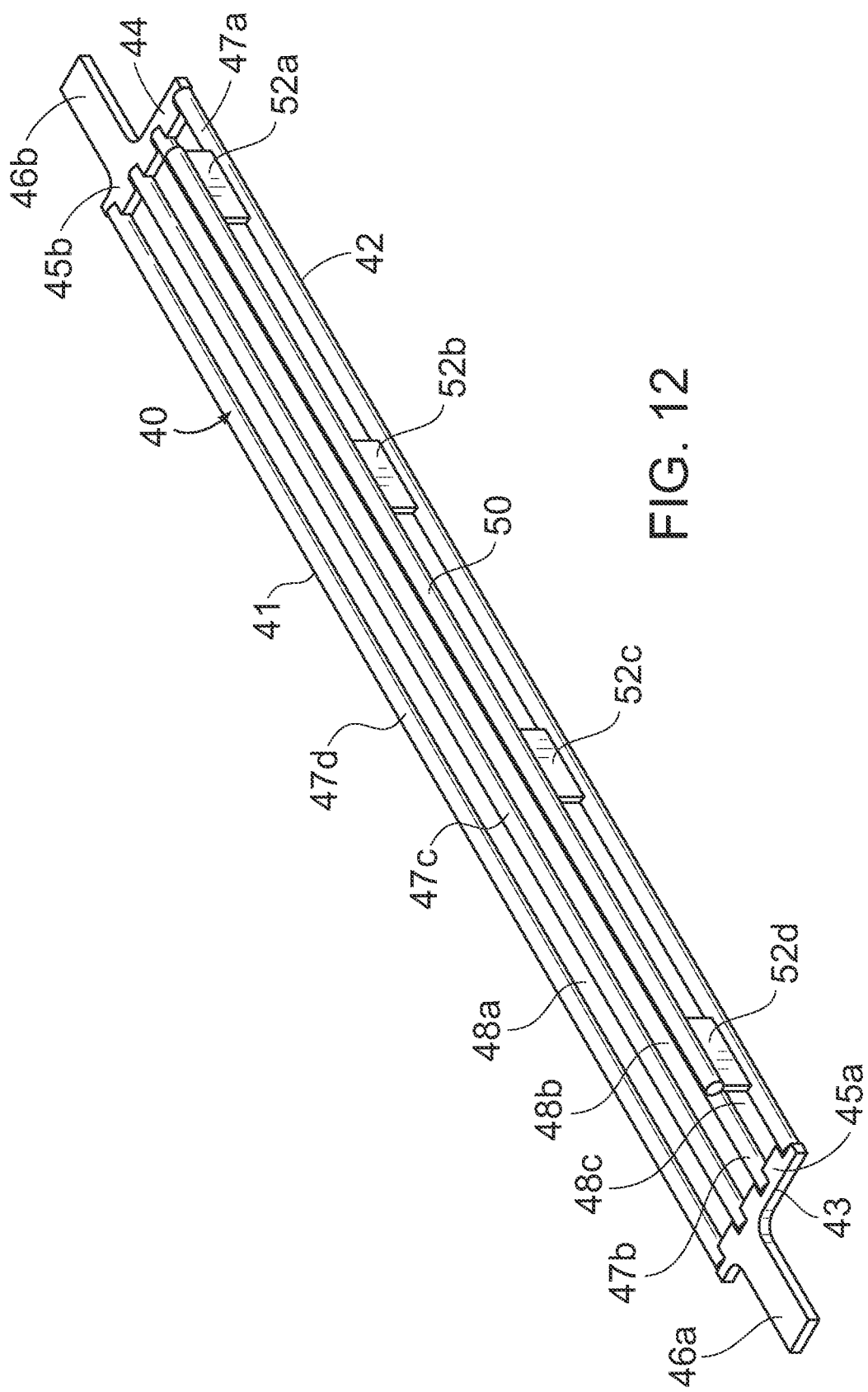
FIG. 12 is an upper perspective view of a paddle conveyor system in accordance with an example embodiment.

Exemplary embodiments of paddles 40 for use with the paddle conveyor 30 are shown in FIGS. 8-12. As best shown in FIGS. 8, 11, and 12, each paddle 40 comprises a substantially rectangular shape including a first end 41, a second end 43, a first side 43, and a second side 44. The first end 41 of each paddle 40 faces towards the direction of movement of the paddle conveyor 30 and the second end 42 of each paddle 40 faces away from the direction of movement of the paddle conveyor 30. As discussed below, the first end 41 of each paddle 40 may overlap with the second end 42 of an adjacent paddle 40.

Figure 6:
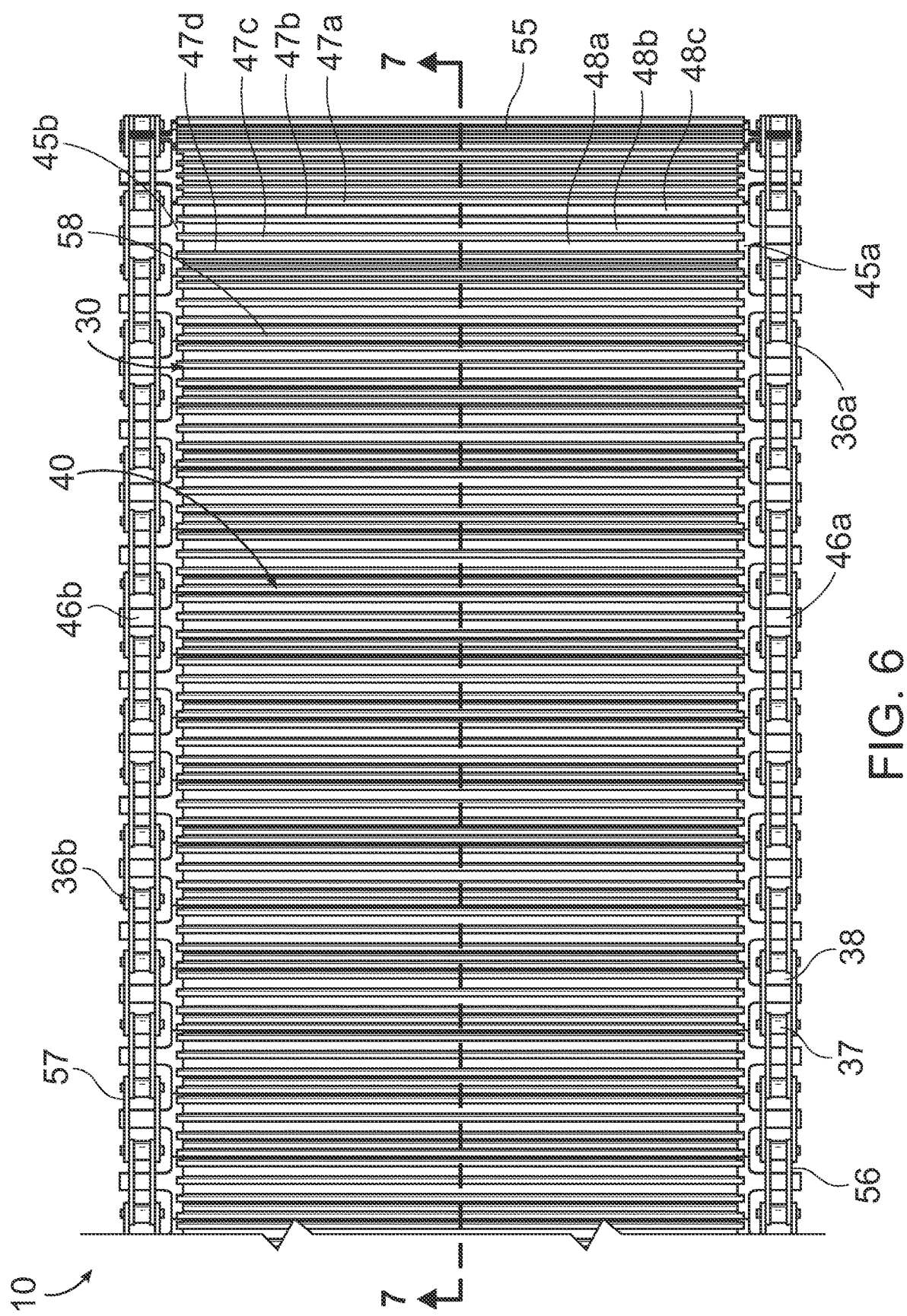
FIG. 6 is a partial top view of a paddle conveyor of a paddle conveyor system in accordance with an example embodiment.

Each of the paddles 40 is connected between the first linkage 36a and the second linkage 36b of the paddle conveyor 30 such as shown in FIG. 6. In the exemplary embodiment shown in the figures, the first side 43 of each paddle 40 is connected to the first linkage 36a and the second side 44 of each paddle 40 is connected to the second linkage 36b. In this manner, the paddles 40 are moved along with the linkages 36a, 36b continuously along a looped path.

The manner in which the paddles 40 are connected between the linkages 36a, 36b may vary in different embodiments. In the exemplary embodiment shown in FIGS. 8-12, each of the paddles 40 comprises a pair of connectors 46a, 46b for connecting to the linkages 36a, 36b. As shown in FIG. 8, an exemplary paddle 40 may comprise a first connector 46a on its first side 43 and a second connector 46b on its second side 44. The first connector 46a engages with the first linkage 36a and the second connector 46b engages with the second linkage 36b.

The type of connector 46a, 46b utilized may vary in different embodiments. An exemplary embodiment of connectors 46a, 46b for use in connecting the paddles 40 between the linkages 36a, 36b is shown in FIGS. 8-12. As shown, each connector 46a, 46b comprises a tab which extends outwardly from the respective sides 43, 44 of the paddles 40. The connectors 46a, 46b may thus engage with the linkages 36a, 36b such that the paddles 40 move along the same path as the linkages 36a, 36b to form the paddle conveyor 30.

Figure 13A:
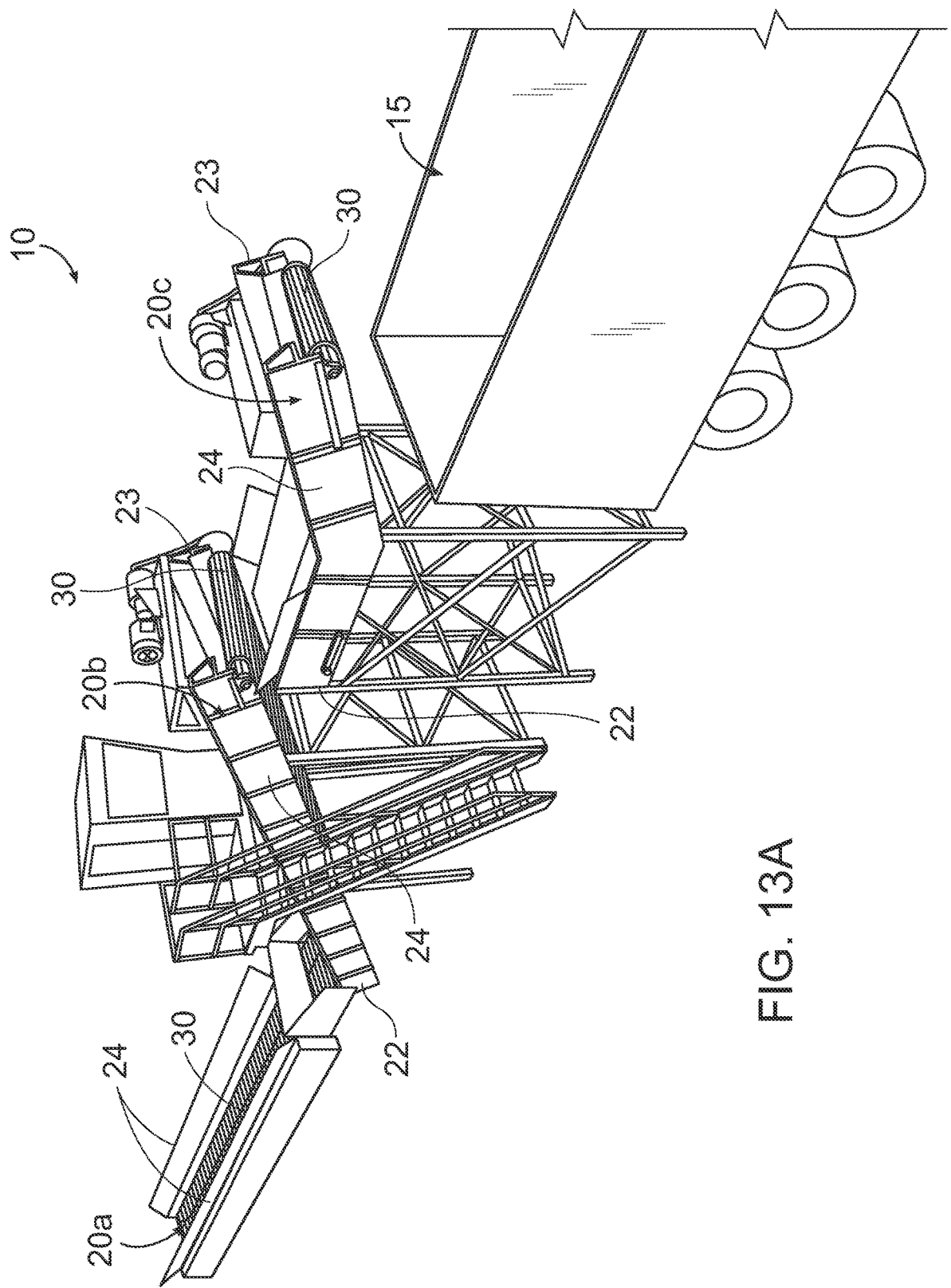
FIG. 13A is a perspective view of a paddle conveyor system in accordance with an example embodiment.
Figure 13B:
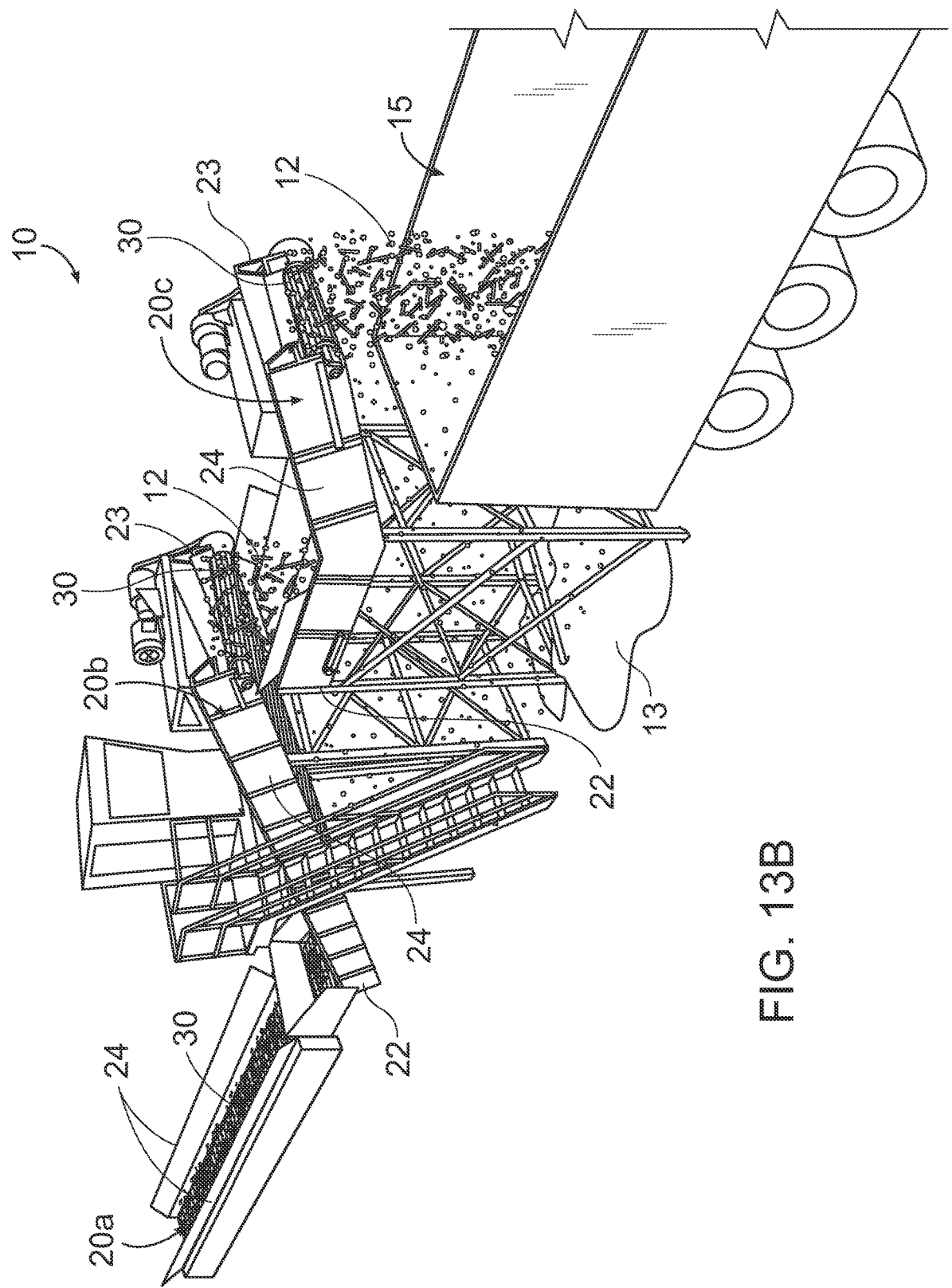
FIG. 13B is a perspective view of a paddle conveyor system in use in accordance with an example embodiment.
Figure 16A:
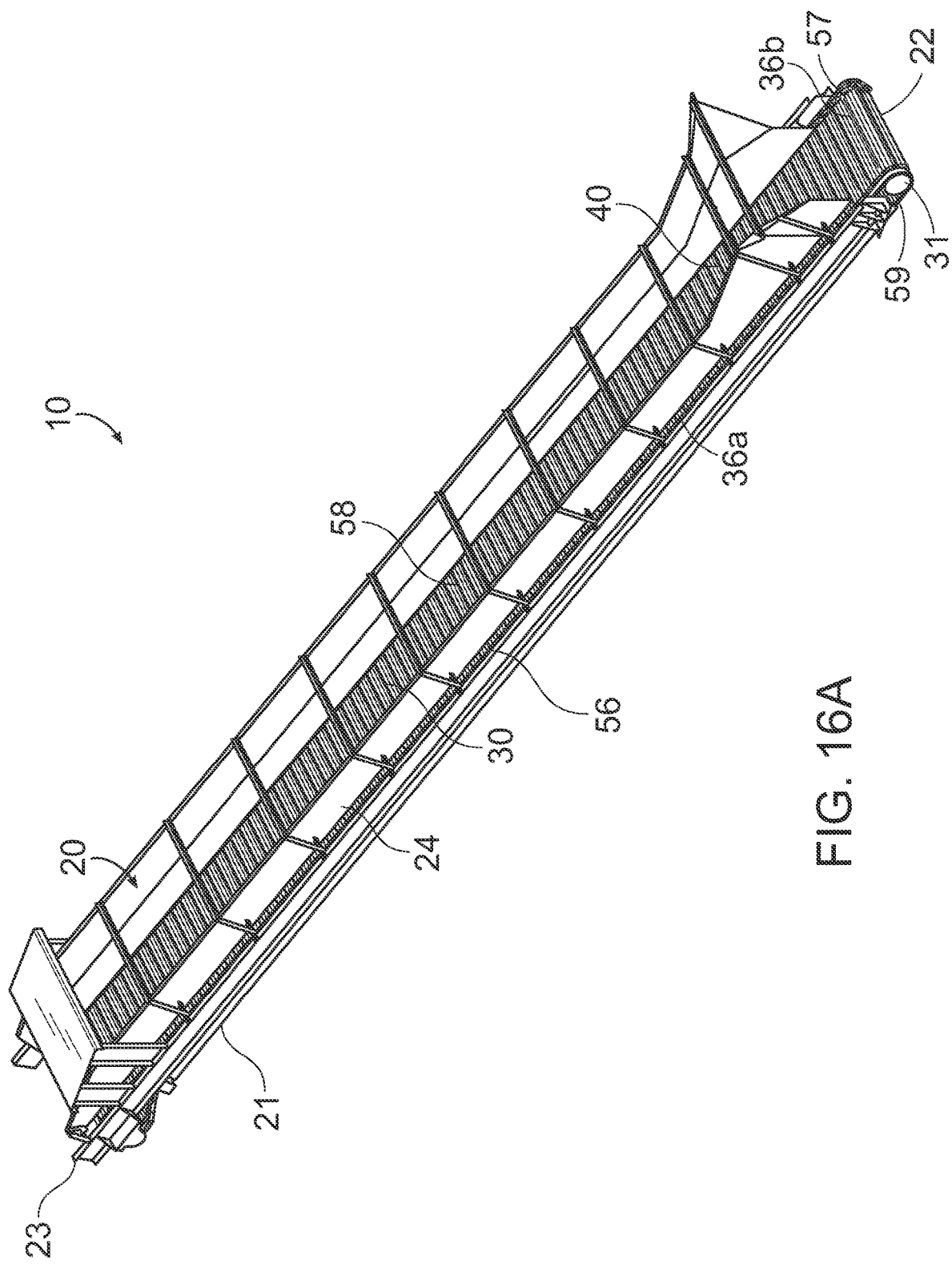
FIG. 16A is a perspective view of a paddle conveyor system in accordance with an example embodiment.
Figure 16B:
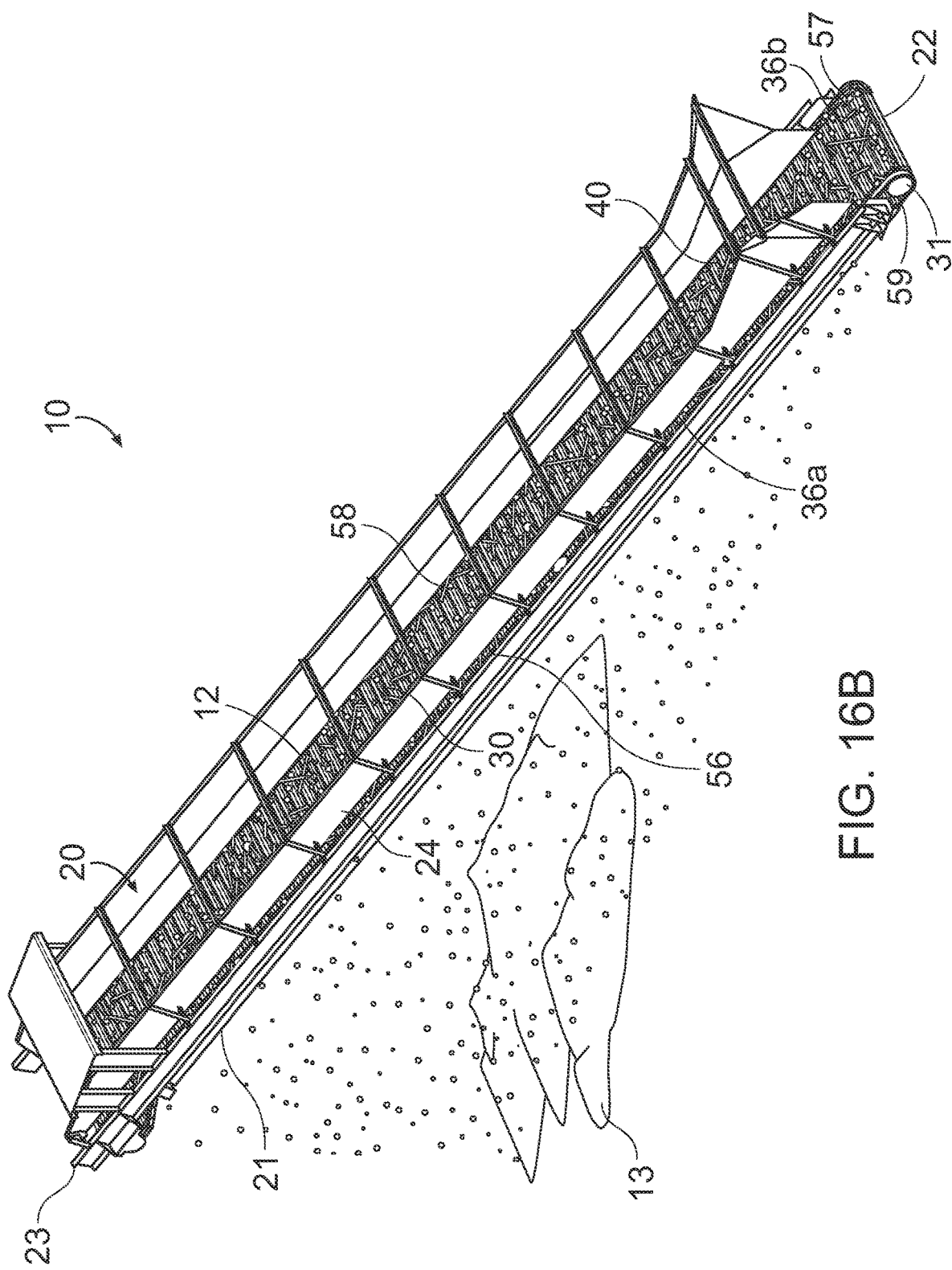
FIG. 16B is a perspective view of a paddle conveyor system in use in accordance with an example embodiment.
Figure 18A:
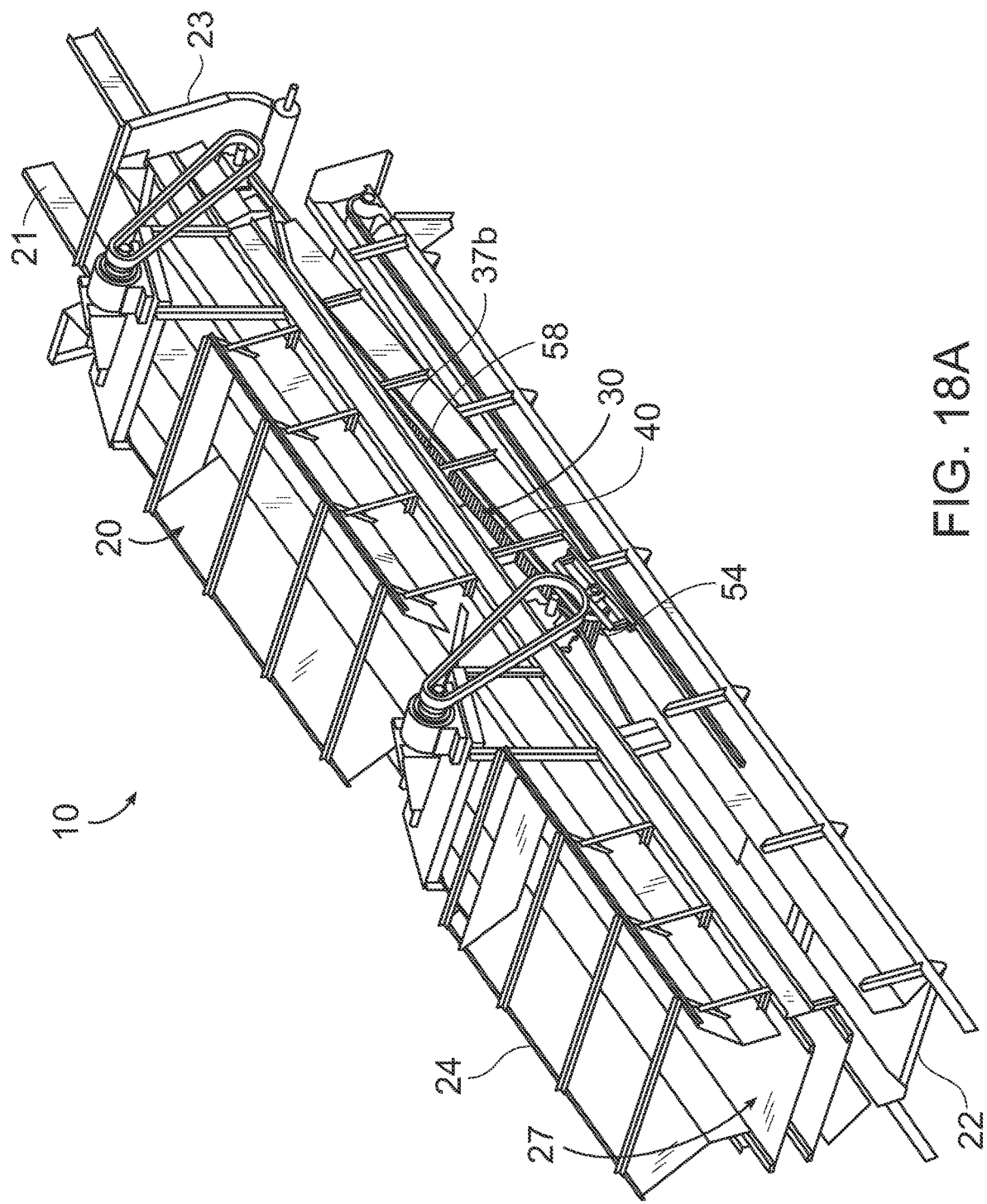
FIG. 18A is a perspective view of a paddle conveyor system in accordance with an example embodiment.
Figure 18B:
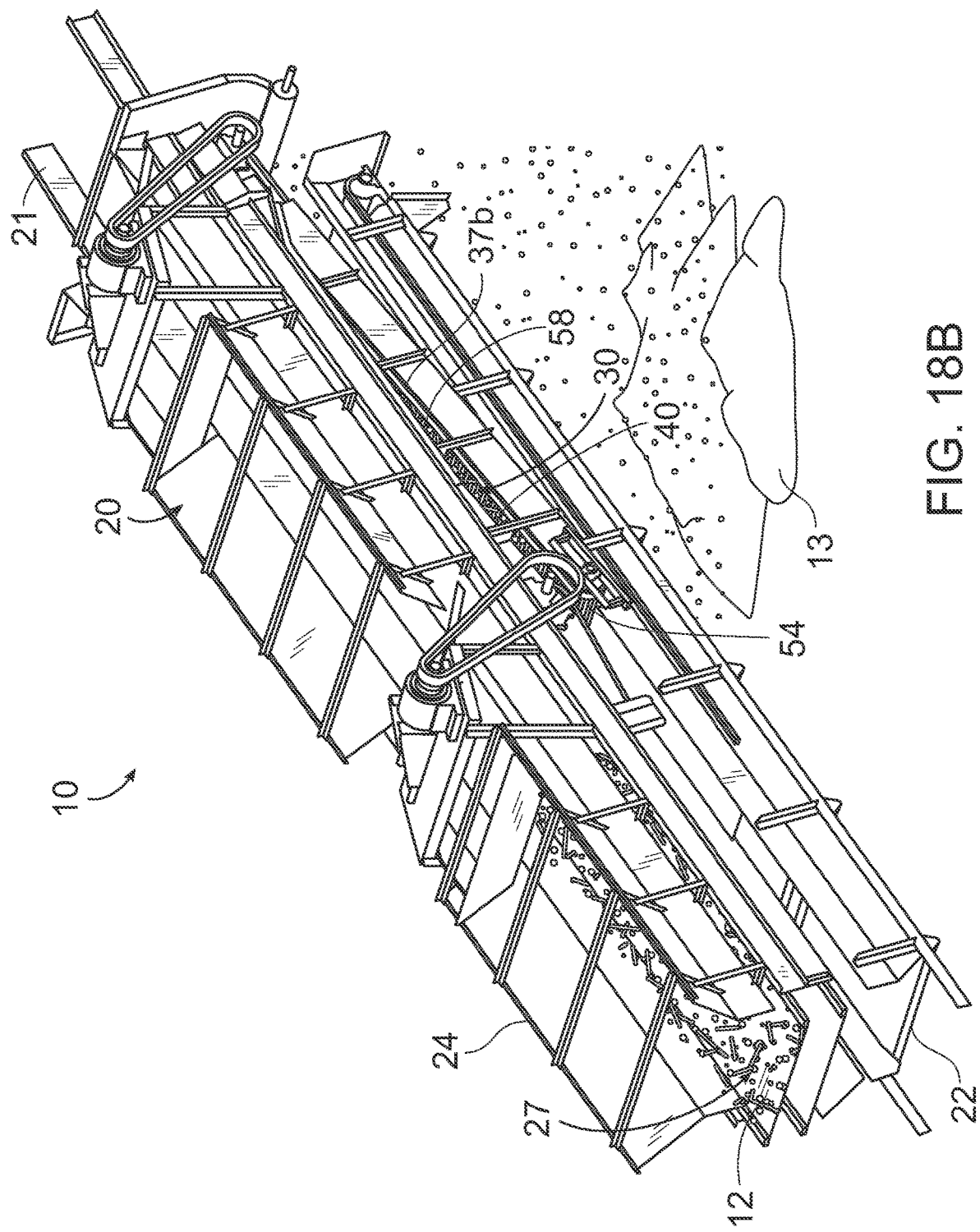
FIG. 18B is a perspective view of a paddle conveyor system in use in accordance with an example embodiment.

As best shown in FIGS. 8-12, each of the paddles 40 comprises one or more slots 48a, 48b, 48c. Each of the slots 48a, 48b, 48c may extend in a direction perpendicular to the direction of movement of the paddle conveyor 30 such as shown in FIG. 7. As materials 12 are conveyed along the paddle conveyor 30 towards the second end 55 of the paddle conveyor 30 for discharge, debris 13 from the materials 12 will be knocked loose and fall through the slots 48a, 48b, 48c and, eventually, onto the ground surface as shown in FIGS. 13B, 16B, and 18B or into a container for later transport.

The shape, size, number, orientation, and positioning of the slots 48a, 48b, 48c may vary in different embodiments. In the exemplary embodiment shown in FIG. 8, it can be seen that the paddle 40 includes a first slot 48a, a second slot 48b, and a third slot 48c. It should be appreciated that more or less slots 48a, 48b, 48c could be utilized in different embodiments, such as to suit different types of materials 12. The sizing of the slots 48a, 48b, 48c may vary depending on the size of the materials 12 as well as the size of the debris 13 desired to be cleaned from the materials 12 as they are conveyed across the paddle conveyor 30.

As best shown in FIGS. 8-12, each of the paddles 40 may comprise a first side member 45a and a second side member 45b. The side members 45a, 45b may comprise a rectangular member to which a plurality of cross members 47a, 47b, 47c, 47d are connected. As shown in FIGS. 8-12, the connectors 46a, 46b may be integrally formed with the side members 45a, 45b. For example, the first connector 46a may be integrally formed with the first side member 45a and the second connector 46b may be integrally formed with the second side member 45b. In other embodiments, the connectors 46a, 46b and side members 45a, 45b may be discrete, interconnected structures.

The connectors 46a, 46b extend outwardly from the side members 45a, 45b to engage with the linkages 36a, 36b such as shown in FIGS. 8-2. In the exemplary embodiments of the figures, it can be seen that the side members 45a, 45b extend in the direction of movement of the paddle conveyor 30 and that the connectors 46a, 46b extend in a perpendicular direction to engage with the linkages 36a, 36b.

As best shown in FIGS. 8 and 10, a plurality of cross members 47a, 47b, 47c, 47d extend between the side members 45a, 45b of the paddles 40. Each of the cross members 47a, 47b, 47c, 47d may comprise an elongated member such as a rod or the like, with a first end of each of the cross members 47a, 47b, 47c, 47d being connected to the first side member 45a and a second end of each of the cross members 47a, 47b, 47c, 47d being connected to the second side member 45b.

The shape, sizing, and number of cross members 47a, 47b, 47c, 47d may vary in different embodiments. In the exemplary embodiments shown in FIGS. 8-12, four cross members 47a, 47b, 47c, 47d are shown: a first cross member 47a, a second cross member 47b, a third cross member 47c, and a fourth cross member 47d. Each of the cross members 47a, 47b, 47c, 47d are parallel and spaced apart so as to define the slots 48a, 48b, 48c between them.

As shown in FIGS. 14A, 14B, 15A, and 15B, each of the cross members 47a, 47b, 47c, 47d extends perpendicular to the direction of movement of the paddle conveyor 30. A first end of each of the cross members 47a, 47b, 47c, 47d is connected to the first side member 45a and a second end of each of the cross members 47a, 47b, 47c, 47d is connected to the second side member 45b, with the cross members 47a, 47b, 47c, 47d extending between the first and second side members 45a, 45b.

As best shown in FIGS. 8-12, a plurality of slots 48a, 48b, 48c are defined between the cross members 47a, 47b, 47c, 47d through which debris 13 may be cleaned from the materials 12. In the exemplary embodiment of FIGS. 8-12, a first slot 48a is defined between the first and second cross members 47a, 47b, a second slot 48b is defined between the second and third cross members 47b, 47c, and a third slot 48c is defined between the third and fourth cross members 47c, 47d. The number of slots 48a, 48b, 48c and the number of cross members 47a, 47b, 47c, 47d may vary in different embodiments to suit different applications.

As shown in FIGS. 1-3 and 5, a plurality of paddles 40 are connected in series with respect to each other to form the paddle conveyor 30. The number of paddles 40 will vary depending on the size of the paddles 40 and the length of the paddle conveyor 30. Thus, the number of paddles 40 forming the paddle conveyor 30 should not be construed as limited by the exemplary figures.

In an exemplary embodiment such as shown in FIGS. 5 and 7, the paddles 40 may be staggered such that they overlap with each other. As best shown in FIG. 5, each of the paddles 40 is upwardly angled between its second end 42 and its first end 41 such that the first end 41 of each paddle 40 overlaps with (is positioned over) the rear end 42 of an adjacent paddle 40. Such a configuration can improve stability of the paddle conveyor 30 overall and allow conveyance of bulkier materials than conventional roller conveyors.

As shown in FIGS. 5 and 7, the paddles 40 may be oriented so as to form an angle with respect to the ground surface when traversing the upper run 58 of the paddle conveyor 30. By way of example, each of the paddles 40 may be at a fifteen degree angle with respect to the ground surface when traversing the upper run 58 of the paddle conveyor 30. While the figures illustrate that the paddles 40 are upwardly angled from the second end 42 to the first end 41 of each paddle 40, it should be appreciated that the reverse configuration could be utilized in different embodiments (e.g., the paddles 40 may be downwardly angle from the second end 42 to the first end 41 of each paddle 40).

In other embodiments, the paddles 40 may not overlap. In such embodiments, the paddles 40 may be horizontally-oriented (at a level angle) when traversing the upper and lower runs 58, 59 of the paddle conveyor 30. In such embodiments, the paddles 40 may be spaced-apart so as to define an additional slot between adjacent paddles 40.

As shown in FIGS. 9 and 12, each of the paddles 40 may comprise a stopper rod 50 which extends between the first and second sides 43, 44 of the paddles 40 at a raised elevation with respect to the cross members 47a, 47b, 47c, 47d. The stopper rod 50 acts to prevent materials 12 from falling backwards along the paddle conveyor 30 when being conveyed.

FIGS. 9 and 12 illustrate an exemplary embodiment of a stopper rod 50 on a paddle 40. As shown, the stopper rod 50 is parallel and vertically spaced-apart with respect to one of the side members 45a, 45b, 45c, 45d. Although the figures illustrate the stopper rod 50 being connected to the first side member 45a, it should be appreciated that the stopper rod 50 in different embodiments could be connected to any of the other side members 45b, 45c, 45d.

As shown in FIGS. 9 and 12, the stopper rod 50 may comprise an elongated member which extends along the length of one of the side members 45a, 45b, 45c, 45d at a point above the relevant side members 45a, 45b, 45c, 45d. Put differently, the stopper rod 50 extends at a higher elevation than the side member 45a, 45b, 45c, 45d to which it is connected (the stopper rod 50 is above the side members 45a, 45b, 45c, 45d). Various types of elongated members may be utilized, including a rod such as shown in the figures.

The manner in which the stopper rod 50 is connected to the side member 45a, 45b, 45c, 45d may vary in different embodiments. In the exemplary embodiments shown in the figures, it can be seen that a plurality of mounts 52a, 52b, 52c, 52d are connected between the stopper rod 50 and the relevant side member 45a, 45b, 45c, 45d. Although the figures illustrate the use of four mounts 52a, 52b, 52c, 52d, it should be appreciated that more or less mounts 52a, 52b, 52c, 52d may be utilized in different embodiments. In some embodiments, a single mount 52a, 52b, 52c, 52d may be utilized.

The mounts 52a, 52b, 52c, 52d may comprise rectangular members, such as tabs, which are connected between the relevant side member 45a, 45b, 45c, 45d and the stopper rod 50. In some embodiments, the side member 45a, 45b, 45c, 45d, mounts 52a, 52b, 52c, 52d, and stopper rod 50 may be integrally formed or may be connected together, such as by welding. The distance (height) between the stopper rod 50 and the relevant side member 45a, 45b, 45c, 45d may vary in different embodiments to suit different types of materials 12.

It should also be appreciated that the number of stopper rods 50 per paddle 40 may vary. Although the figures illustrate that each paddle 40 includes one stopper rod 50, in some embodiments each paddle 40 may include multiple stopper rods 50. In other embodiments, each paddle 40 may not include a stopper rod 50, with stopper rods 50 being positioned on some, but not all, of the paddles 40 forming the paddle conveyor 30. For example, every other paddle 40 could comprise a stopper rod 50, with the paddles 40 therebetween not having a stopper rod 50.

D. Conveying Systems

As shown throughout the figures, the systems and methods described herein may be utilized on a wide range of conveying systems 20. Such conveying systems 20 may comprise a single paddle conveyor 30, such as shown in FIG. 16A, or may comprise a combination of multiple paddle conveyors 30 such as shown in FIG. 13A. In some embodiments, one or more paddle conveyors 30 may be used in combination with one or more belt conveyors 27 such as shown in FIGS. 17A, 17B, 18A, and 18B.

The conveying systems 20 will generally be utilized to convey materials 12 such as crops from a first location to be discharged at a second location. The length and width of the conveying system 20 may vary in different embodiments to suit different needs, and thus should not be construed as limited by the exemplary figures.

The conveying system 20 generally comprises a first end 22 and a second end 23. The materials 12 may be loaded onto the conveying system 20 at the first end 22, or may be loaded onto various other points between the first and second ends 22, 23 of the conveying system 20. Further, the manner in which the conveying system 20 is loaded with materials 12 may vary. For example, the conveying system 20 may receive the materials 12 from another conveying system 20, or may receive the materials 12 which are dumped directly onto the conveying system 20.

As shown throughout the figures, the second end 23 of the conveying system 20 may comprise a discharge outlet through which the materials 12 are discharged. The materials 12 may be discharged into a transport vehicle 15 such as shown in FIG. 13B. In other embodiments, the materials 12 may be discharged onto another conveying system 20, or onto the ground surface for collection at a later time.

An exemplary conveying system 20 may comprise a frame 21 on which a paddle conveyor 30 is connected in a manner such that the paddle conveyor 30 moves in an endless loop with respect to the frame 21. In some embodiments, additional conveyors such as belt conveyors 27 may be utilized in combination with a paddle conveyor 30 such as shown in FIG. 17A. As best shown in FIGS. 13, 16A, and 16B, the conveying system 20 may comprise sidewalls 24 which prevent materials 12 from falling off the sides of the conveying system 20 while the materials 12 are being conveyed toward the second end 23 for discharge.

FIGS. 13A and 13B illustrate a first exemplary embodiment showing multiple conveying systems 20a, 20b, 20c being interconnected to convey materials 12 into a transport vehicle 15. In such an embodiment, a first conveying system 20a comprises a horizontally-oriented first paddle conveyor 30 on which the materials 12 are loaded. A second conveying system 20b is connected in line with the first conveying system 20a, with the second conveying system 20b including a second paddle conveyor 30 which is upwardly-angled. A third conveying system 20c is connected in line with the second conveying system 20b, with the third conveying system 20c including a third paddle conveyor 30 which is upwardly-angled. The third paddle conveyor 30 discharges the materials 12, which have been cleaned of debris 13 by the paddle conveyors 30, into the transport vehicle 15. As can be seen in FIG. 13B, the debris 13 has piled up underneath the conveying systems 20b, 20c to be retrieved later.

FIGS. 16A and 16B illustrate another exemplary embodiment which utilizes a single conveying system 20 including a frame 21, sidewalls 24, and an upwardly-angled paddle conveyor 30. Such a configuration may be useful for conveying materials 12 upwardly to be loaded into a transport vehicle 15, hopper, or storage unit which is at a raised elevation. As shown in FIG. 16B, it can be seen that debris 13 has been separated from the materials 12 and dropped underneath the paddle conveyor 30. The upward angle of the paddle conveyor 30 allows the debris 13 to pile up if needed.

FIGS. 17A, 17B, 18A, and 18B illustrate yet another embodiment of a conveying system 20 in which both a belt conveyor 27 and a paddle conveyor 30 are utilized. As can be seen, the materials 12 are initially loaded onto the belt conveyor 27, after which they are conveyed onto the paddle conveyor 30 to be cleaned of debris 13 and then discharged.

As shown in FIG. 18B, the debris 13 has piled up underneath the paddle conveyor 30, but not underneath the belt conveyor 27. Such a configuration may be useful when it is desired to limit debris 13 to a certain location along the path of conveyance, with the belt conveyor 27 serving to convey the materials 12 without cleaning debris until reaching the paddle conveyor 30.

E. Operation of Preferred Embodiment

In use, the paddle conveyor 30 may be utilized on its own (standalone) or as part of a larger conveying system 20. The paddle conveyor 30 may be utilized with other conveyors, including belt conveyors 27 or other paddle conveyors 30. The paddle conveyor 30 may be in-line with the other conveyors, or may be angularly-oriented such as perpendicular.

Whether standalone or in combination with a conveying system 20, materials 12 are first loaded onto the paddle conveyor 30. The manner in which the materials 12 are loaded onto the paddle conveyor 30 may vary in different embodiments. By way of example, the materials 12 could be poured or shoveled onto the paddle conveyor 30. Alternatively, in some embodiments, the materials 12 may be fed onto the paddle conveyor 30 from a different conveyor, such as a belt conveyor 27 or another paddle conveyor 30.

The location along the paddle conveyor 30 on which the materials 12 are loaded may also vary in different embodiments. In some embodiments, the materials 12 may be fed onto the paddle conveyor 30 from a different conveyor, such as a belt conveyor 27. The materials 12 may be loaded in such embodiments directly into the first end 54 of the paddle conveyor 30.

In other embodiments, the materials 12 may be loaded onto the paddle conveyor 30 at other locations along its length between its first and second ends 54, 55. For example, the materials 12 could be loaded onto the paddle conveyor 30 by being dropped or shoveled onto the mid-point of the paddle conveyor 30.

Before, after, or concurrently with the materials 12 being loaded onto the paddle conveyor 30, the paddle conveyor 30 may be activated. One or more of the pulleys 31, 32 may be driven, such as by a motor and belt, causing the pulleys 31, 32 to rotate. As the pulleys 31, 32 rotate, the linkages 36a, 36b will traverse a looped path such as shown in FIGS. 1 and 5.

As the linkages 36a, 36b traverse the looped path, the paddles 40 of the paddle conveyor 30 similarly traverse the same path due to the paddles 40 being connected to the linkages 36a, 36b by the connectors 46a, 46b. The materials 12 are positioned on the paddles 40 such that the materials 12 are conveyed towards the second end 55 of the paddle conveyor 30 for discharge.

The materials 12 are conveyed across the upper run 58 of the paddle conveyor 30. As the materials 12 are so conveyed, debris 13 will be jostled loose from the materials 12. The debris 13 will fall through slots 48a, 48b, 48c in the paddles 40 and underneath the paddle conveyor 30 for future retrieval. The debris 13 may be collected on the ground surface, such as shown in FIGS. 13B and 16B, or may be collected in a container or vehicle.

As shown in FIGS. 8-12, each of the paddles 40 may include a stopper rod 50 which extends upwardly from one or more of the cross members 47a, 47b, 47c, 47d of the paddles 40. The stopper rod 50 will prevent materials 12 from falling backwards along the paddle conveyor 40 towards the first end 54 of the paddle conveyor 30. Rather than falling backwards along the paddle conveyor 30, the materials 12 will catch on the stopper rod 50 and be prevented from further movement in the reverse direction.

Such a configuration may be particularly useful with paddle conveyors 30 at inclines, such as shown in FIG. 16A, where force of gravity will try to force the materials 12 back towards the first end 54 of the paddle conveyor 30. With the stopper rods 50 in use, the materials 12 will be unable to fall back, thus increasing efficiency.

Upon reaching the second end 55 of the paddle conveyor 30, the materials 12 will be discharged. The materials 12 may be discharged onto another conveyor, such as a paddle conveyor 30 or belt conveyor 27 or may be discharged into a transport vehicle 15 such as shown in FIG. 13B. In other embodiments, the materials 12 may be discharged directly onto the ground surface for later retrieval.

After discharging the materials 12, the paddles 40 will traverse around the second pulley 32 and along the lower run 59. At the end of the lower run 59, the paddles 40 will traverse around the first pulley 31 to begin the upper run 58 again, where additional materials 12 may be loaded. Debris 13 which is cleaned from the materials 12 may pile up underneath the paddle conveyor 30 such as shown in FIG. 13B.

The figures illustrate exemplary embodiments of different conveying systems 20 utilizing paddle conveyors 30 in use. In FIGS. 13A and 13B, an embodiment is shown utilizing three separate paddle conveyors 30, with the first paddle conveyor 30 receiving the materials 12 at a level incline, the second paddle conveyor 30 conveying the materials 12 upwardly and onto the third paddle conveyor 30, which conveys the materials 12 further upwardly to be discharged over its second end 55 into a transport vehicle 15 such as shown in FIG. 13B.

Figure 14B:
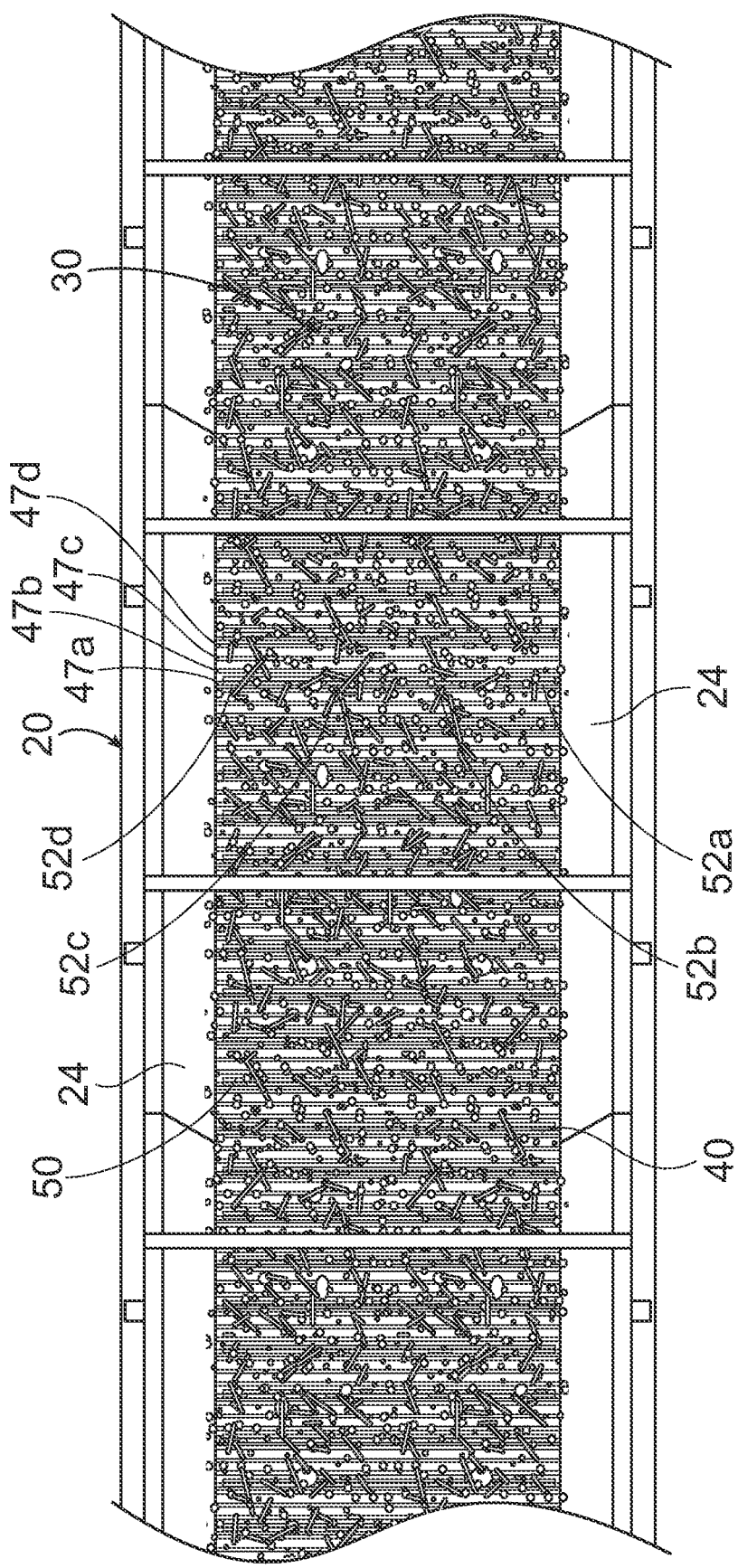
FIG. 14B is a top view of a paddle conveyor system in use in accordance with an example embodiment.
Figure 15A:
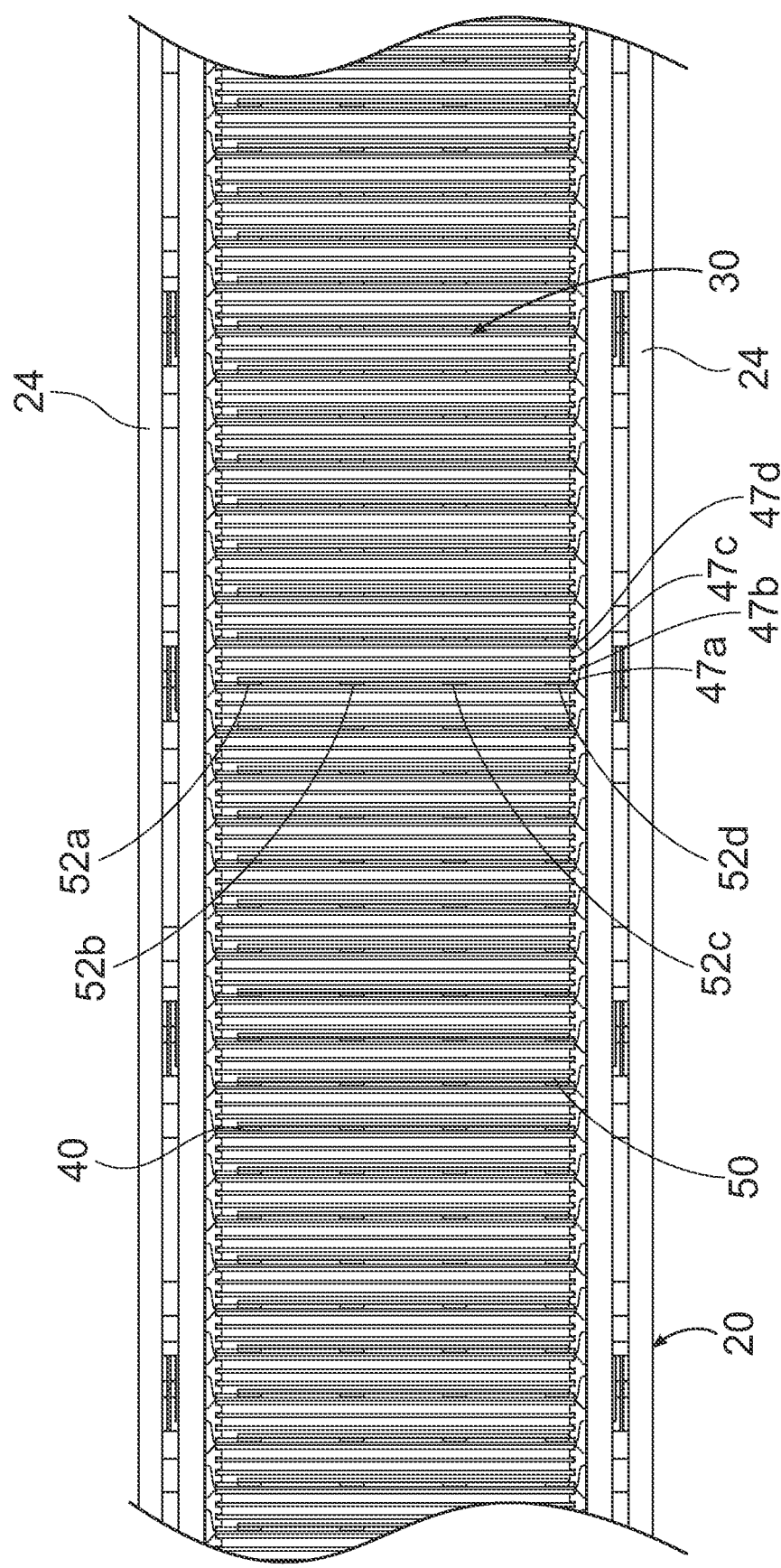
FIG. 15A is a bottom view of a paddle conveyor system in accordance with an example embodiment.
Figure 15B:
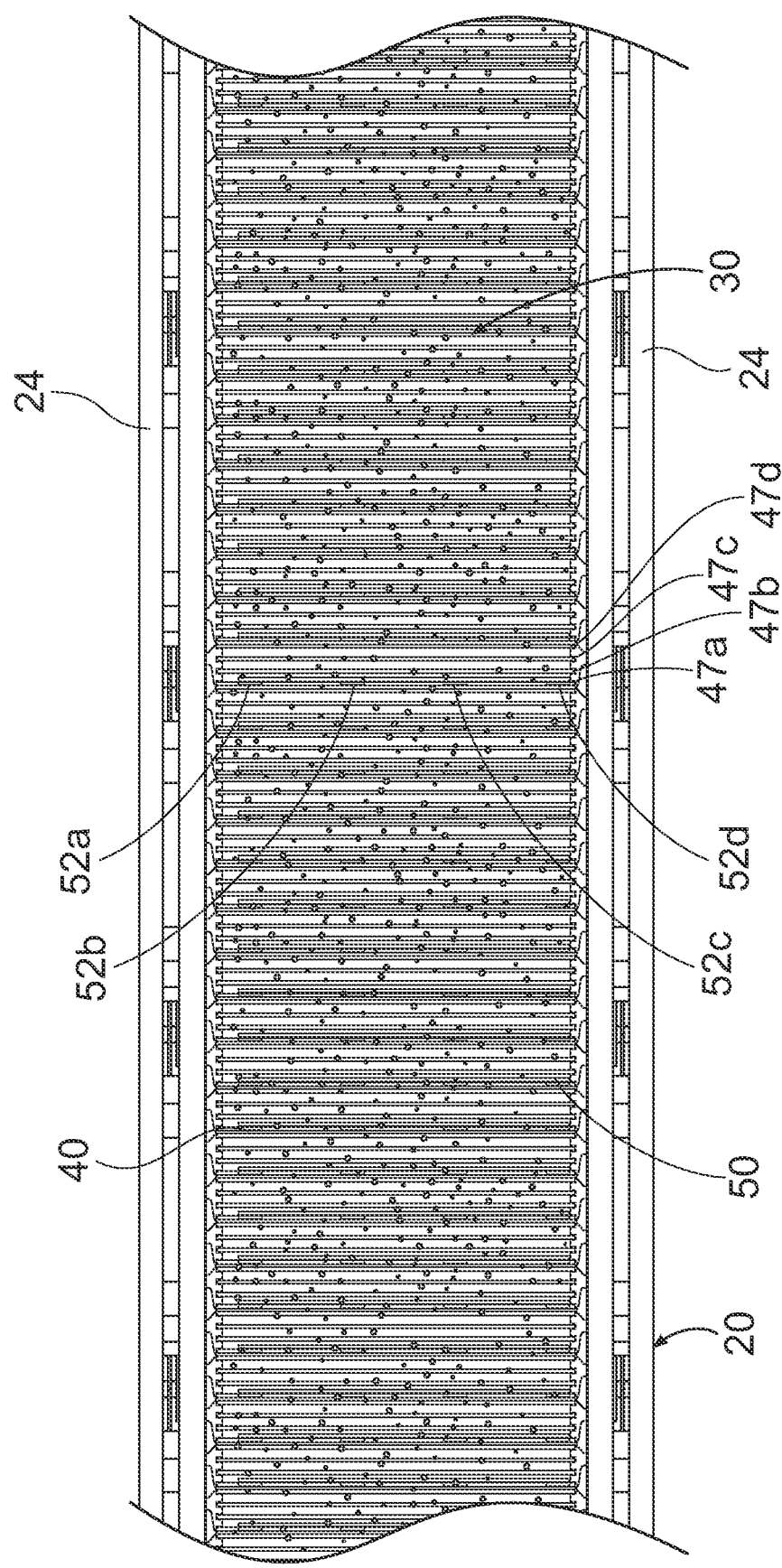
FIG. 15B is a bottom view of a paddle conveyor system in use in accordance with an example embodiment.

FIGS. 14A and 14B illustrate a top view of a paddle conveyor 30 with and without materials 12 being conveyed thereon. As can be seen in FIG. 14B, the materials 12 are conveyed across the upper run 58 of the paddle conveyor 30. FIGS. 15A and 15B illustrate a bottom view of the same paddle conveyor 30, with FIG. 15B illustrating debris 13 falling through the slots 48a, 48b, 48c of the paddle conveyor 30.

FIG. 16A illustrates a single paddle conveyor 30 arranged in an upward incline. As shown in FIG. 16B, materials 12 may be conveyed upwardly along the upper run 58 of the paddle conveyor 30. As the materials 12 are so conveyed, debris 13 is shaken loose and falls through the slots 48a, 48b, 48c to collect underneath the paddle conveyor 30. In this embodiment, the upward incline of the paddle conveyor 30 allows the debris 13 to pile up under the paddle conveyor 30 for future retrieval.

FIGS. 17A, 17B, 18A, and 18B illustrate yet another embodiment of a conveying system 20 which utilizes both a belt conveyor 27 and a paddle conveyor 30. As shown in FIGS. 17B and 18B, the materials 12 may be loaded onto the belt conveyor 27 and then conveyed onto the paddle conveyor 30. No debris 13 is removed while the materials 12 traverse the belt conveyor 27. This configuration may be desirable if there are areas over which the materials 12 need to be conveyed that the operator does not want debris 13 to fall onto.

As shown in FIGS. 17B and 18B, the debris 13 is removed from the materials 12 as the materials 12 traverse the paddle conveyor 30. The debris 13 collects underneath the paddle conveyor 30, but not the belt conveyor 27, as shown in FIG. 18B. The upward incline of the paddle conveyor 30 from its first end 54 to its second end 55 allows for the debris 13 to pile up for future retrieval, or provides space sufficient to position a transport vehicle 15 or container under the paddle conveyor 30 to retrieve the debris 13 falling thereunder.

Unless otherwise defined, all technical and scientific terms used herein have the same meaning as commonly understood by one of ordinary skill in the art to which this invention belongs. Although methods and materials similar to or equivalent to those described herein can be used in the practice or testing of the paddle conveyor, suitable methods and materials are described above. All publications, patent applications, patents, and other references mentioned herein are incorporated by reference in their entirety to the extent allowed by applicable law and regulations. The paddle conveyor may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A paddle conveyor, comprising:
   a first pulley;
   a second pulley;
   a first linkage connected between the first pulley and the second pulley;
   a second linkage connected between the first pulley and the second pulley; and
   a plurality of paddles adapted to convey a material, wherein the plurality of paddles are each connected between the first linkage and the second linkage such that the plurality of paddles form a loop, wherein each of the plurality of paddles comprises a plurality of rods extending in parallel between the first linkage and the second linkage, wherein each of the plurality of paddles includes one or more slots through which debris from the material falls.

2. The paddle conveyor of claim 1, wherein each of the one or more slots is defined between a pair of the plurality of rods.

3. The paddle conveyor of claim 1, wherein each of the plurality of paddles comprises a first side member and a second side member, wherein each of the plurality of rods extends between the first side member and the second side member.

4. The paddle conveyor of claim 3, wherein the first side member of each of the plurality of paddles comprises a first connector and the second side member of each of the plurality of paddles comprises a second connector.

5. The paddle conveyor of claim 4, wherein the first connector of each of the plurality of paddles is connected to the first linkage and the second connector of each of the plurality of paddles is connected to the second linkage.

6. The paddle conveyor of claim 1, wherein each of the plurality of paddles comprises a front end and a rear end, wherein each of the plurality of paddles is angled upwardly from the rear end to the front end such that each of the plurality of paddles overlap.

7. The paddle conveyor of claim 1, wherein the first linkage and the second linkage are each comprised of a chain.

8. The paddle conveyor of claim 1, wherein each of the plurality of paddles comprises a stopper rod for preventing the material from falling back toward a rear end of the plurality of paddles.

9. The paddle conveyor of claim 1, wherein each of the plurality of paddles are perpendicular with respect to a direction of movement of the plurality of paddles along the loop.

10. A paddle conveyor, comprising:
    a first pulley;
    a second pulley;
    a first linkage connected between the first pulley and the second pulley;
    a second linkage connected between the first pulley and the second pulley; and
    a plurality of paddles adapted to convey a material, wherein the plurality of paddles are each connected between the first linkage and the second linkage such that the plurality of paddles form a loop, wherein each of the plurality of paddles comprises a plurality of parallel rods extending between a first side member and a second side member, wherein each of the plurality of paddles comprises one or more slots defined between the plurality of parallel rods through which debris from the material falls.

11. The paddle conveyor of claim 10, wherein the first side member of each of the plurality of paddles comprises a first connector and the second side member of each of the plurality of paddles comprises a second connector.

12. The paddle conveyor of claim 11, wherein the first connector of each of the plurality of paddles is connected to the first linkage and the second connector of each of the plurality of paddles is connected to the second linkage.

13. The paddle conveyor of claim 10, wherein each of the plurality of paddles comprises a front end and a rear end, wherein each of the plurality of paddles is angled upwardly from the rear end to the front end such that each of the plurality of paddles overlap.

14. The paddle conveyor of claim 10, wherein the first linkage and the second linkage are each comprised of a chain.

15. The paddle conveyor of claim 10, comprising a stopper rod extending parallel with respect to one of the plurality of paddles.

16. The paddle conveyor of claim 15, comprising a plurality of mounts connected between the stopper rod and one of the plurality of paddles.

17. The paddle conveyor of claim 10, wherein each of the plurality of paddles are perpendicular with respect to a direction of movement of the plurality of paddles along the loop.

18. A paddle conveyor, comprising:
    a first pulley comprised of a first gear and a second gear;
    a second pulley comprised of a first gear and a second gear;
    a first chain connected between the first gear of the first pulley and the first gear of the second pulley;
    a second chain connected between the second gear of the first pulley and the second gear of the second pulley; and
    a plurality of paddles adapted to convey a material, wherein the plurality of paddles are each connected between the first chain and the second chain such that the plurality of paddles form a loop;
    wherein each of the plurality of paddles comprises a plurality of rods extending between a first side member and a second side member, wherein each of the plurality of paddles comprises one or more slots defined between the plurality of rods through which debris from the material falls.

19. The paddle conveyor of claim 18, wherein each of the plurality of paddles comprises a stopper rod extending parallel with respect to the plurality of rods.

20. The paddle conveyor of claim 18, wherein each of the plurality of paddles comprises a front end and a rear end, wherein each of the plurality of paddles is angled upwardly from the rear end to the front end such that each of the plurality of paddles overlap.

* * * * *